United States Patent [19]

Corbethau

[11] Patent Number: 4,665,530
[45] Date of Patent: May 12, 1987

[54] APPARATUS FOR REPLACING THE ELECTRODES OF ELECTRIC ARC FURNACES

[76] Inventor: Eric Corbethau, 13, rue du Chene, 67200 Oberhausbergen, France

[21] Appl. No.: 689,044
[22] PCT Filed: Apr. 6, 1984
[86] PCT No.: PCT/FR84/00095
 § 371 Date: Dec. 7, 1984
 § 102(e) Date: Dec. 7, 1984
[87] PCT Pub. No.: WO84/04017
 PCT Pub. Date: Oct. 11, 1984
[51] Int. Cl.$^4$ .................................... H05B 7/14
[52] U.S. Cl. ................................ 373/92; 81/57.15
[58] Field of Search ............... 373/91, 92, 93, 88; 29/240; 81/57.15; 403/DIG. 5

[56] References Cited

U.S. PATENT DOCUMENTS

| | | | |
|---|---|---|---|
| 2,322,918 | 6/1943 | Brooke | 81/57.15 |
| 3,796,818 | 3/1974 | Yuasa et al. | 373/92 |
| 3,937,867 | 2/1976 | Wynne | 373/92 |
| 4,185,158 | 1/1980 | Koga et al. | 373/92 |
| 4,397,026 | 8/1983 | Fuchs | 373/92 |
| 4,400,815 | 8/1983 | Dunn et al. | 373/92 |
| 4,420,838 | 12/1983 | Dunn et al. | 373/92 |
| 4,484,897 | 11/1984 | Schudlich et al. | 81/57.15 X |
| 4,518,365 | 5/1985 | Schudlich et al. | 81/57.15 X |

FOREIGN PATENT DOCUMENTS

| | | |
|---|---|---|
| 0063279 | 10/1982 | European Pat. Off. . |
| 1690556 | 5/1971 | Fed. Rep. of Germany . |
| 2338741 | 2/1975 | Fed. Rep. of Germany . |
| 2418688 | 10/1975 | Fed. Rep. of Germany . |
| 2624974 | 12/1976 | Fed. Rep. of Germany . |
| 3016350 | 11/1981 | Fed. Rep. of Germany . |
| 2176156 | 10/1973 | France . |

*Primary Examiner*—Roy N. Envall, Jr.
*Attorney, Agent, or Firm*—Young & Thompson

[57] ABSTRACT

The present invention relates to a machine for replacing the electrodes of electric arc furnaces.

Machine characterized in that the sheath (3) is provided, between its gripping chucks, with a centering chuck (7), in that the upper chuck (4) is provided with an expansible support (8) limiting its opening, and with pinions (9) for driving the gripping spiral of the retractable jaws (10), and in that the device (6) for driving in rotation the sheath (3), is constituted by a screw (11)-nut (12) assembly for the translatory movement of the sheath (3), by motors (13) for final screwing of the electrode, and by a device (14) for driving in rotation and braking the sheath (3), the assembly of the control elements being actuated pneumatically.

34 Claims, 18 Drawing Figures

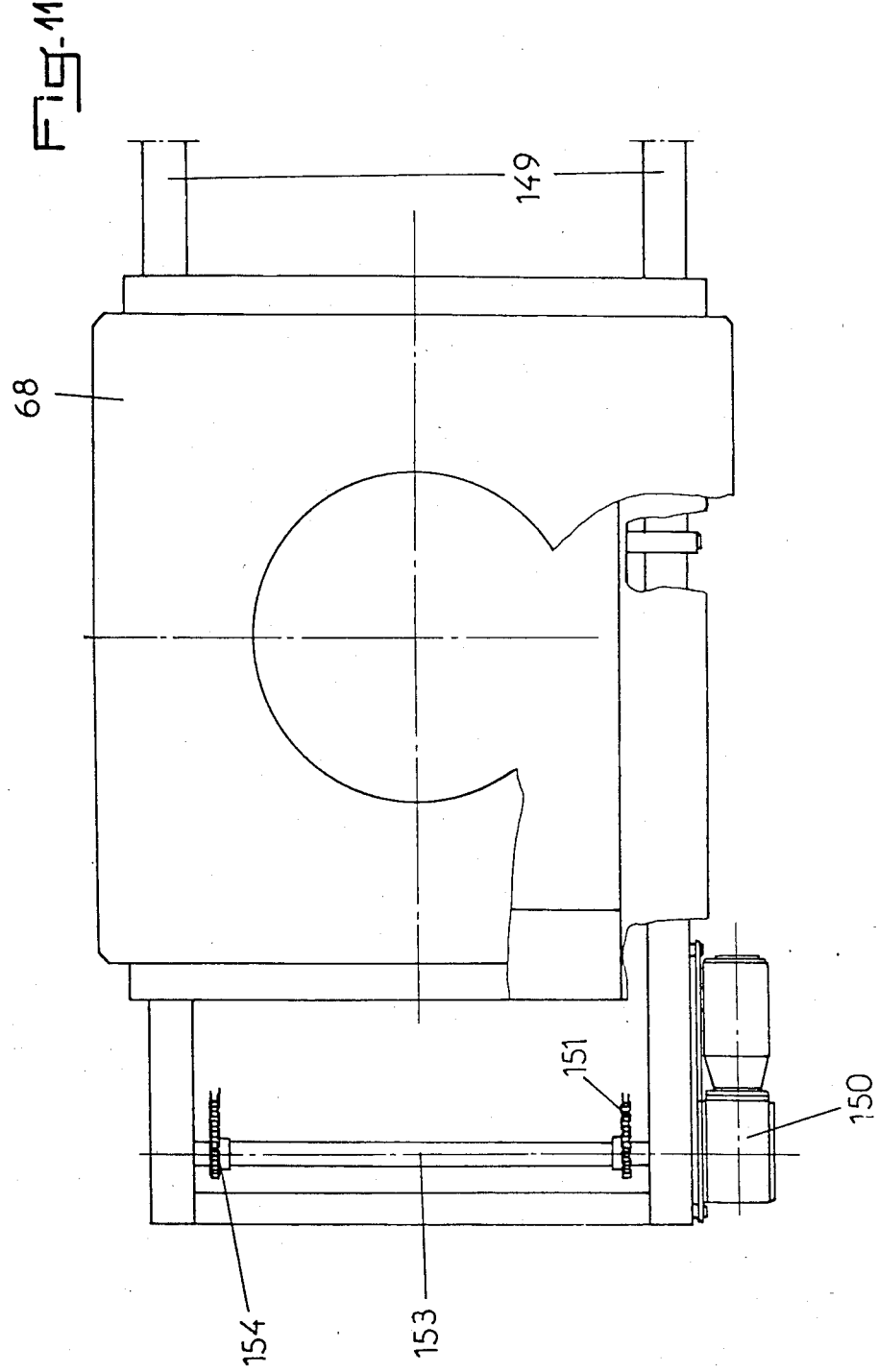

APPARATUS FOR REPLACING THE ELECTRODES OF ELECTRIC ARC FURNACES

The present invention concerns the field of electric arc furnaces for steelworks and foundries, and has as its object an apparatus for replacing the electrodes of such furnaces.

At present, the mounting of such electrodes is generally carried out by manually assembling a column of three electrodes on a mounting stand, from where said column is removed in order to be transferred to the furnace by means of a traversing hoist.

After partial consumption, such a column is withdrawn from the furnace for cooling down and replacement with a new electrode. However, such a mounting process entails a relatively important time loss, and therefore a relatively long stopping period of the plants, which causes moreover oxidation of the electrode as well as a large heat loss in the furnace.

In certain cases, it is equally possible to carry out a manual mounting of the electrodes directly on the furnace during operation. This procedure avoids the drawbacks of the above-mentioned process, but its actual operation is nevertheless difficult and dangerous for the operators.

The present invention's aim is to overcome these drawbacks.

Thus it has as its object an apparatus for replacing the electrodes of electric arc furnaces, basically formed by a body provided with a hooking handle for a hook of a traversing hoist, by a sheath disposed in the body and provided with two tightening chucks, an upper and a lower one, respectively, and by a device for driving the sheath in rotation, characterized in that the sheath is provided with a centering chuck between its tightening chucks, in that the upper chuck is provided with an expansible support limiting its opening, and pinions for driving the tightening spiral of the retractable jaws, and in that the device for driving the sheath in rotation is formed by a screw-nut assembly for displacing the sheath in translation, by motors for the final screwing of the electrode, and by a device for driving in rotation and braking the sheath, the whole group of the control elements being pneumatically controlled.

According to a different embodiment of the invention, for the replacement of the electrodes from the bottom, the apparatus is essentially formed by a sheath, disposed in a vertical construction of two parts, a lower and an upper one, joined between them by a support plate and provided, near its opening, with a single differential chuck with hydropneumatic control, by a reference jack-vertical translation jack assembly acting on the lower part of the sheath by means of a pressure plate, a hollow support and the screw-nut assembly for screwing the electrode, by a centering cam centered on the sheath and coacting with the differential chuck, and by an assembly for gauging the screwing force on the electrode mounted on the upper part of the vertical construction.

According to another embodiment of the invention, for the replacement of the electrodes from the top, the body of the housing of the sheath is joined to the hooking handle of a hook of a traversing hoist by means of pneumatic springs, the upper and lower tightening chucks as well as the centering chucks have a hydropneumatic control, while the upper chuck coacts with a centering cam, a hydropneumatic pump feeds said chucks with interposition of a pneumatic control circuit, whose feed is ensured by compressed air tanks with periodical filling by means of a compressor.

The invention will be better understood thanks to the following description which refers to some preferred embodiments, given as non-limiting examples, and explained with reference to the accompanying schematic drawings, in which:

FIG. 11 is a plan view of the carriage of FIG. 10;

Figure 1:
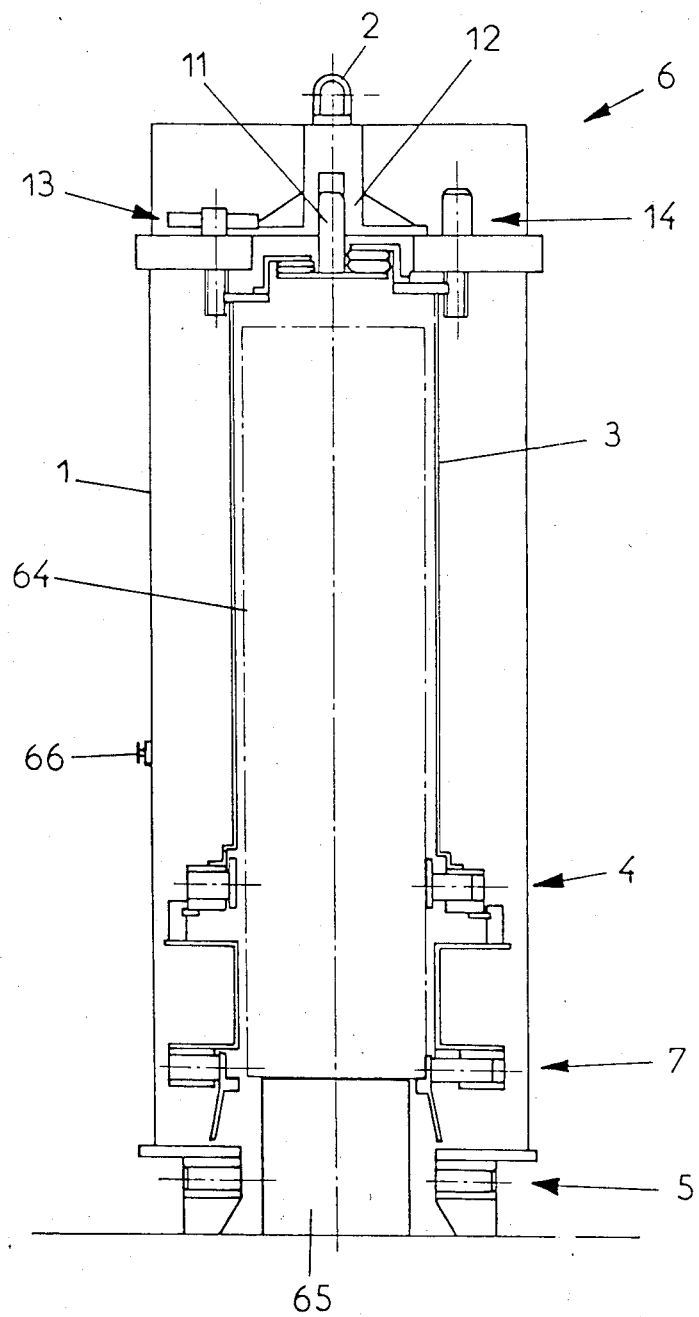
FIG. 1 is an elevational view in cross-section of an apparatus according to the invention in the loading position of an electrode.
Figure 2:
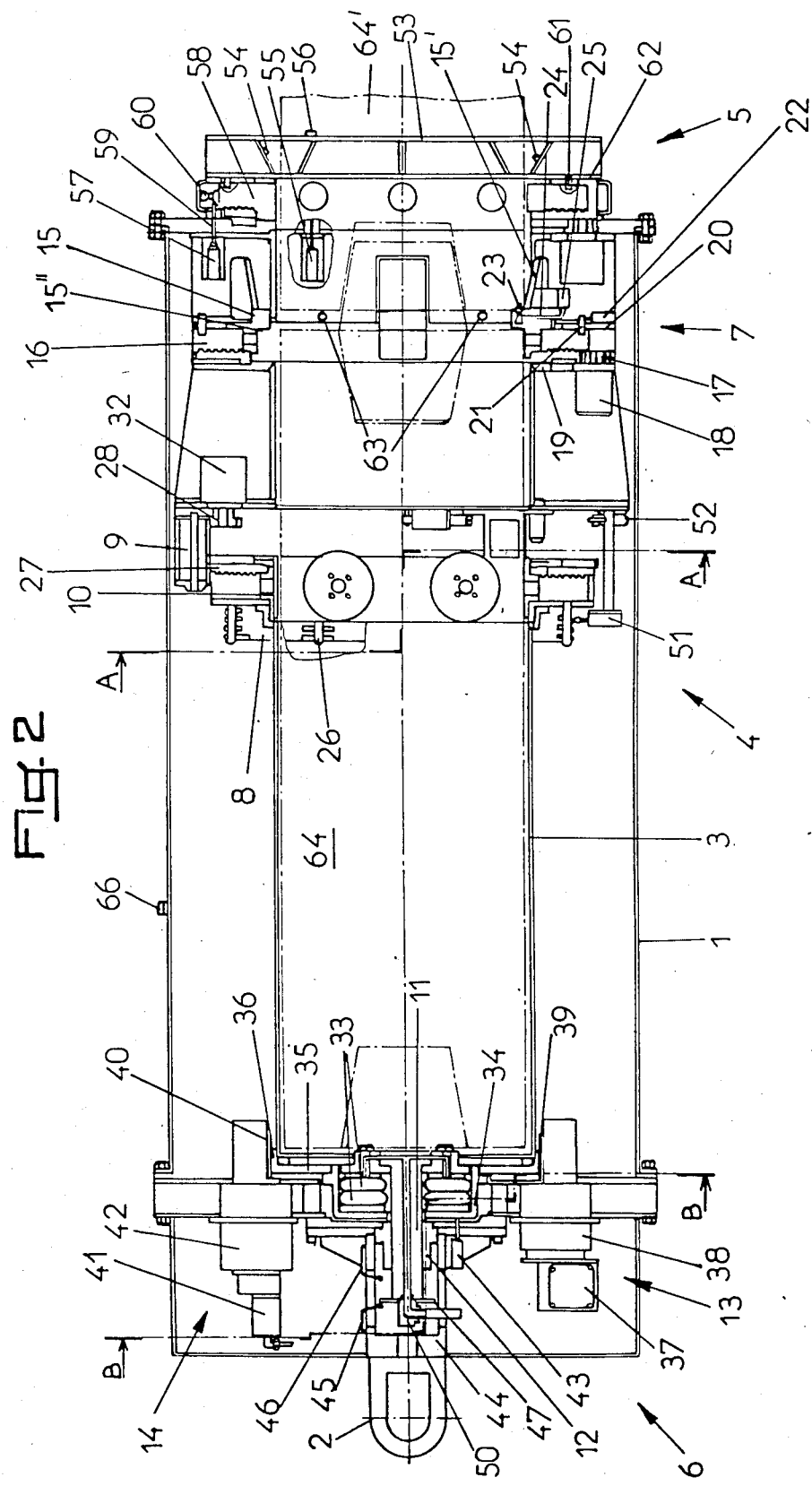
FIG. 2 is a cross-sectional view on larger scale of the apparatus according to FIG. 1.

According to the invention, and as shown in greater detail as an example in FIGS. 1 and 2 of the enclosed drawings, the apparatus for replacing the electrodes of electric arc furnaces, which is basically formed by a body 1 provided with a hooking handle 2 for a hook of a traversing hoist, by a sheath 3 disposed in the body 1, and provided with two chucks 4 and 5, an upper and a lower one, respectively, and by a device 6 for driving the sheath 3 in rotation, is characterized in that the sheath 3 is provided with a centering chuck 7 between its tightening chucks 4 and 5, and the upper chuck 4 is provided with an expansible support 8 limiting its opening, and pinions 9 for driving the tightening spiral of the disconnectible jaws 10, and in that the device 6 for driving the sheath 3 in rotation is formed by a screw 11-nut 12 assembly for displacing the sheath 3 in translation by motors 13 for the final screwing of the electrode, and by a device 14 for driving in rotation and braking the sheath 3. The whole group of control devices of the apparatus according to the invention is pneumatically controlled.

The centering chuck 7 is formed by jaws 15 having an internal shoulder 15", which are engaged on their backside with a toothed spiral 16, whose teeth coact with the pinion 17 of the shaft of a pneumatic motor 18, by side plates 19 and 20 fixed to the body 1, and serving as a support for the motor 18 and for centering and guiding the toothed spiral 16, respectively, and for guiding the jaws 15, by an assembly formed by a jaw 21 and an end-of-course contact 22 for opening the jaws 15, and by an assembly formed by a support 23, a valve stem 24, and an end-of-course contact 25 for the approach of the loaded apparatus to an operating electrode.

Each of the jaws 15 is provided with a protruding foot 15' extending in the direction of the lower tightening chuck 5 and inclined towards the external side relative to the sheath 3 axis at an angle corresponding to the angle of inclination of the threaded end part of the electrode, and the internal shoulder 15" forms a safety wedge during transport and has a thickness such as to avoid any contact between the threads of the electrodes to be joined.

Figure 3:
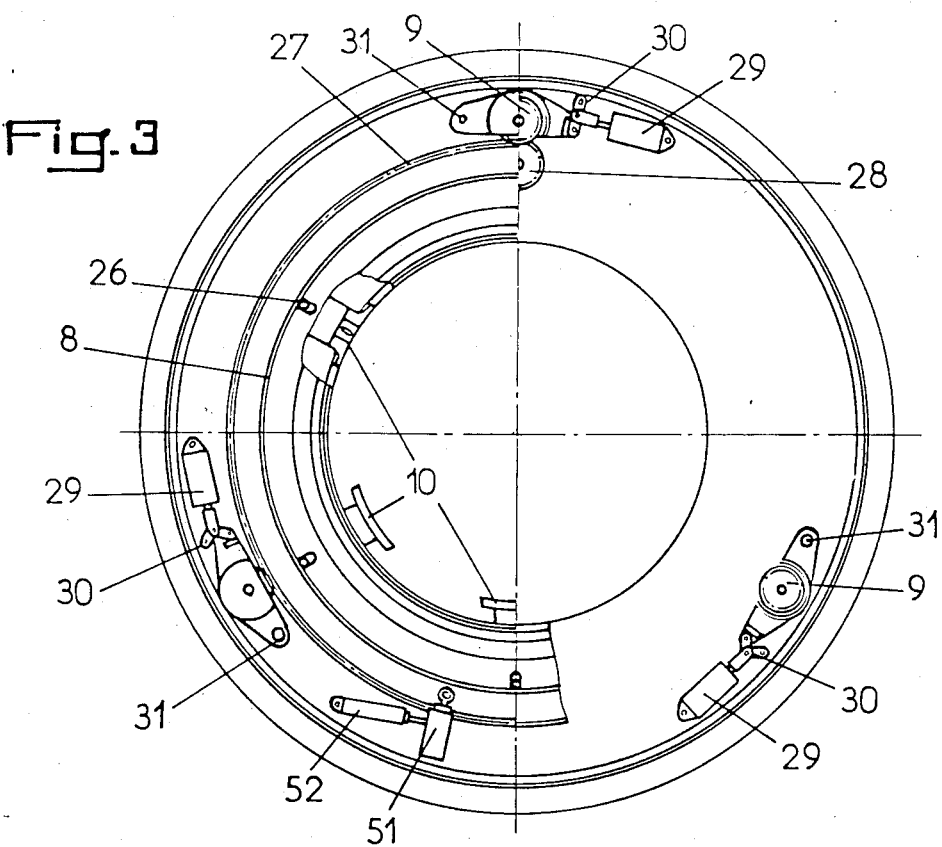
FIG. 3 is a cross-sectional view, on larger scale, along the line A—A of FIG. 2.

The expansible support 8 of the chuck 4 is preferably formed by circular segments interconnected like hinges by means of axles 26 fixed to jaws 10 and covered advantageously by a neoprene sleeve, and each of the pinions 20 for driving its tightening spiral 27, by means of a pneumatic motor 32, is joined in disconnectible driving connection to said spiral 27 by means of a retractable pinion 9 with the help of a jack 29 and a joint 30 by pivoting around an axles 31 (FIG. 3).

Figure 4:
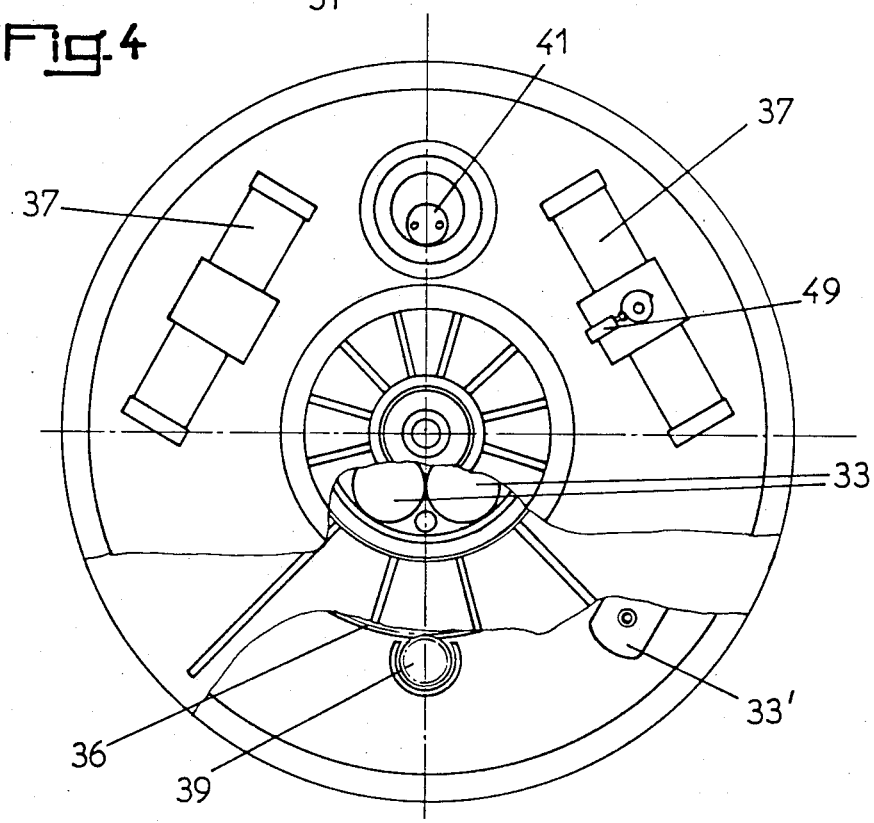
FIG. 4 is a cross-sectional view, on larger scale, along the line B—B of FIG. 2.

The screw 11 of the screw 11-nut 12 assembly for displacing the sheath 3 in translation is fixed to the latter by means of flexible jacks 33, joined in an advantageous way to a buffer tank 33', and coacting with a drum 34 fixed on a plate 35 of the upper end of the sheath 3, this plate having a toothed crown 36 for driving in rotation coacting with the motors 13, and with the device 14 (FIG. 4).

Thanks to this embodiment, the mounting of the sheath 3 on the screw 11 is a floating mounting, permitting absorbing the loading fluctuations by equilibrating the pressures in the flexible jacks 33.

The nut 12 is fixed to the body 1, which moreover carries, on the one hand, the motors 13 for the final screwing of the electrodes, which are under the form of coupling jacks 37 each of them provided with a toothed clutch 38 and a driving pinion 39 coacting with the toothed crown 36 and, on the other hand, the device 14 for driving in rotation and braking of the sheath 3, which is formed by a pinion 40 for driving the sheath 3, fixed to a pneumatic motor 41, and by a brake 42 between the motor 41 and the pinion 40.

The nut 12 is provided with an end-of-course contact 43 detecting the vertical displacement of the sheath 3 under the effect of the inflation of the flexible jacks 33 which actuate the drum 34, and on the lifting handle 44 fixed to the nut 12 and the lifting handle 2 contacts of the high and low end of the course 45 and 46 of the screw 22 are provided which coact with a washer 47 fixed to the latter.

The shaft for driving at least one pinion 39 of an motor 13 is moreover provided with a cam 48 coacting with an end-of-course contact 49 for limiting the rotation of the pinion 39, which is in circuit with a timed pressure control calibrated at a value slightly below that of the tightening couple necessary between the electrodes, and which operates the clutch 38 of the jack 37 after delay and controls the return of the latter if said couple is not reached, repeat the tightening until the couple is reached.

The compressed air feed of the flexible jacks 33 and of the buffer tank 33' is carried out by means of a coaxial conduit of the screw 11 which is provided with a rotary joint 50 joined to the main compressed air feeding conduit which is either attached to a compressor provided on the traversing hoist by means of a flexible conduit, or to a pressurized tank provided in or on the body 1.

The upper chuck 4 moreover, is provided with a retractable end-of-course contact 51 operated by a jack 52 and controlling the opening of the lower chuck 5 as well as timing the ascent of the sheath 3 to its starting point after a jacking operation of the electrode.

The lower chuck 5 is provided, on the one hand, on the periphery of its control part 53, with blowers 54 with a functioning period limited by timing, and whose operation is controlled by a timed switch 55 operated by a projecting stem 56 on the lower part of the chuck 5, and, on the other hand, by an end-of-course contact 57 for opening the jaws 58 coacting, by means of a stem 59 with a cam 60 fixed to a jaw 58, moreover each of the jaws 58 being provided with a support 61 coacting with a corresponding recess of a control plate 62.

Finally, the sheath 3, on its periphery, at the level of the shoulders 15" of the jaws 15 of the centering chuck 7, is provided with blowers 63, whose operation is controlled by means of a timer (not shown) by the end-of-course contact 22 for opening the jaws, and whose period of operation is timed as needed.

The apparatus according to the invention operates in the following way:

The electrode 64 which has to be replaced (FIG. 1), which is vertically disposed on a support 65, is covered by the apparatus fixed to the hook of a traversing hoist by means of its hooking handle 2. The fixing of the electrode begins by starting the assembly by means of a start button 66 provided on the body 1, and which causes the blocking of the brake 42 as well as the starting of the motor 32 causing the tightening of the upper chuck 4. A timed pressure regulator, not shown, disposed on the feeding conduit of the motor 32 controls its stopping and the pressurization of the flexible jacks 33 and of the buffer tank 33'. When the pressure in the jacks 33 becomes greater than the weight of the sheath 3-electrode 64 assembly, the sheath 3 rises inside the body 1 and presses on the end-of-course contact 43 which stops the feeding of the jacks 33 and controls the starting of the motor 18 for closing the jaws 25 of the centering chuck 7. At the end of the tightening of this chuck, a pressure control (not shown) mounted on the feeding conduit of the motor 18 stops the compressed air supply of the latter and sends an end-of-cycle sound and/or light signal in a known way.

The electrode 64 is then kept in the sheath 3 and supported at its bottom by the shoulders 15" of the jaws 15, and it can be transferred over the furnace. When it is lifted, the valve stem 56 releases the timed switch 55, and this latter, after a period of time determined as a function of the length of the trip between the stand and the furnace, operates the blowers 54, whose functioning period is equally limited by timing.

When the electrode 64 which has to be replaced is lowered onto the electrode 64' of the furnace (FIG. 2) the end-of-course contact 25 is operated by means of its support 23 and its valve stem 24, and it controls the closing of the lower chuck 5, while a timed pressure control on the feeding conduit of the motor for closing the chuck 5 controls the opening of the centering chuck 7. At the end-of-course opening of the latter, the support 21 of one of its jaws 15 pressed the end-of-course opening contact 22 which causes the unblocking of the brake 42 and the starting of the motor 41 for driving the sheath 3 in rotation, to which a translatory movement is simultaneously imparted due to the unscrewing of the screw 11 in the nut 12, the thread of the screw 11 corresponding to that of the threading of the electrode 64. The contact 22 simultaneously operates a timer controlling the partial disengagement of the pinions 9 by means of the jacks 29 as well as the starting of the blowers 63, so that a free assembling of the electrodes is made possible in the case of eccentricity of the threading axes with respect to the generatrices of the electrodes, and that an air stream at the level of the contact surfaces of the electrodes is ensured which guarantees the cleanliness of the contact surfaces.

The volume of air contained in the buffer tank 33' is calculated so as to allow a limitation of the pressure on the flanks of the threads to several tens of kilograms at the time of the contact between the threadings before the screwing.

At the end of the screwing as the faces of the electrodes 64 and 64' are in contact with each other, the motor 41 is blocked, and a pressure control mounted on its feeding conduit sends a control signal to the clutching jacks 37 to which the driving pinions 39 are fixed by means of the clutches 38, and which then cause an angular displacement of the sheath 3 supporting the electrode. The couple given by the jacks 37 is accurately regulated by means of a pressure reducer and a timed pressure control (not shown), calibrated at a slightly lower value than the pressure necessary for the screwing couple, operates the clutches 38 and controls the return to the starting position of the jacks 37. In case this final screwing couple is not reached at the end-of-course arrival of the jacks 37, the cam 48 of the pinion 39 axle with at least one jack, operates the end-of-course contact 49 which triggers a return to the starting position of the jacks 37 after disconnection and a new screwing cycle until the desired couple is achieved.

As soon as the pressure corresponding to this couple is reached, the pressure control controls the return to the starting position of the jacks 37 in the previously described way. The end-of-course contact 49 then controls the jacks 29 which cause the engagement of the pinions 9 with the toothed crown of the tightening spiral 27, and the end-of-course arrival of these pinions 9 actuates the brake 42 and the setting into an operating position of the retractable end-of-course contact 51 by means of its jack 52 as well as the starting of the pneumatic motor 32 to open the chuck 4. This opening is stopped by the end-of-course contact 51 which then controls the purging of the flexible jacks 33 and of the buffer tank 33', the unblocking of the brake 42 and the opening of the lower chuck 5, whose end-of-course contact 57 controls the retraction of the contact 51 by means of the jack 52, sends a sound and/or light end-of-cycle signal, and by means of a timer, controls the ascent of the sheath 3 to its starting point by means of a motor 41.

The upper end-of-course contact 45 cuts off the feeding of the motor 41 as soon as it is operated by the washer 47 fixed to the screw 11, and operates the brake 42.

The lower end-of-course contact 46 is designed to cut off the feeding of the motor, as soon as it is started, in order to avoid an excessive exit of the screw 11 from the nut 12, and the expansible support 8 is designed to allow the operation of the retractable end-of-course contact 51 whatever the angular position of the chuck 4 might be, the retraction of this contact being provided for to avoid a prolonged contact of its roller with the support 8 during the raising or lowering movements of the sheath 3.

The apparatus according to the invention permits the handling of electrodes, with variable length and diameter, and it operates entirely with compressed air, so that it has a great reliability and a great security of use in a hot and dusty environment.

Figure 5:
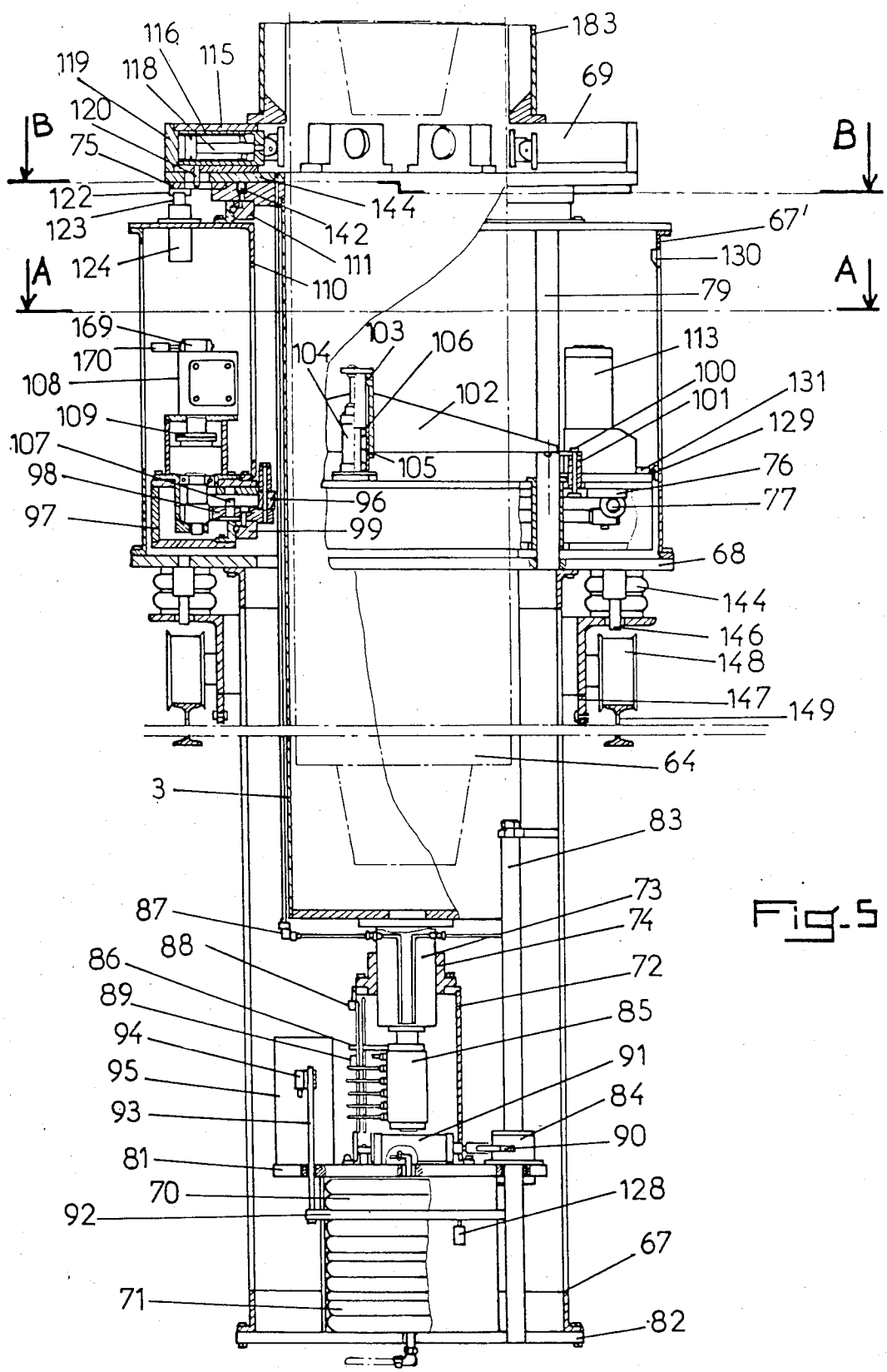
FIG. 5 is a lateral elevational view in cross-section of a different embodiment of the apparatus according to the invention.
Figure 6:
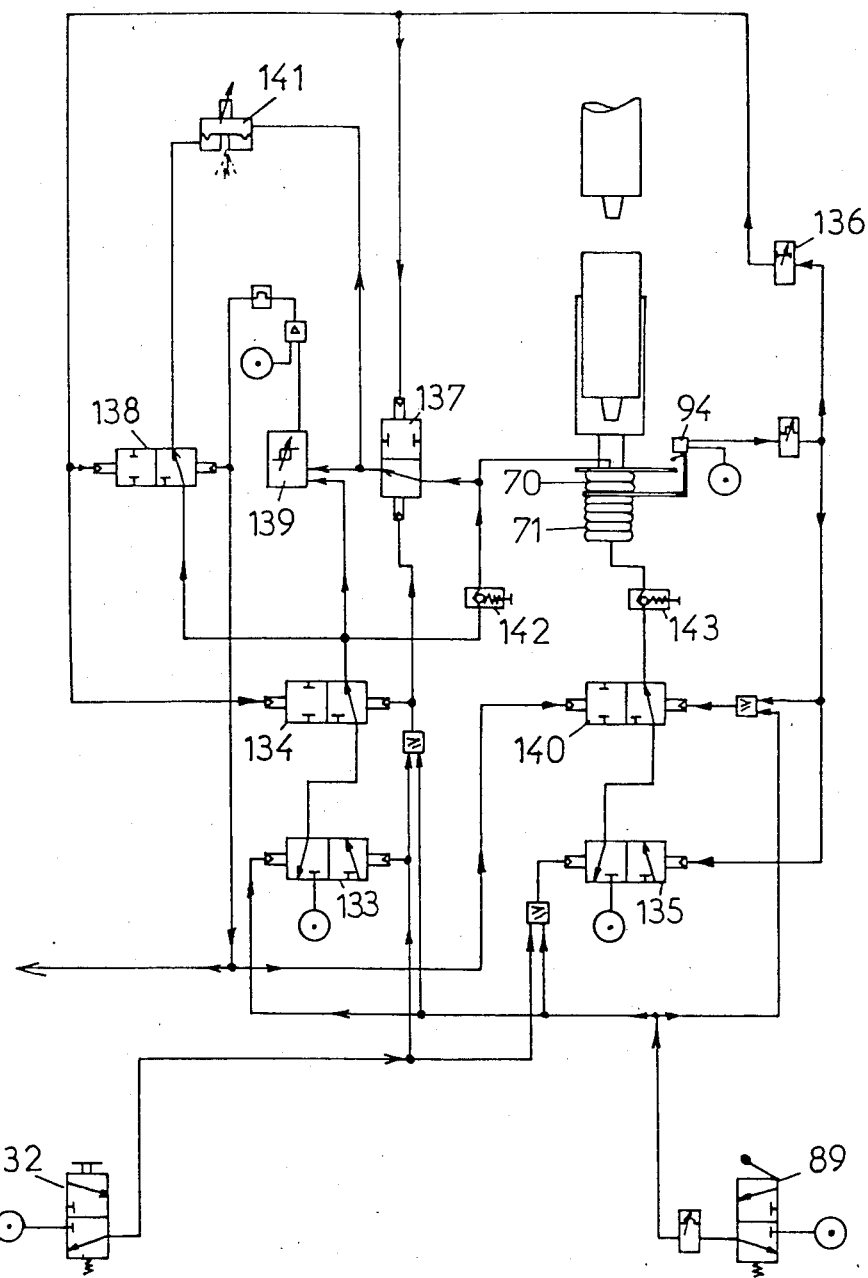
FIG. 6 is a diagram of the pneumatic control of the screwing.

According to a different embodiment of the invention, and as shown in greater detail as an example, in FIG. 5 of the accompanying drawings, for the replacement of the electrodes from the bottom, the apparatus is basically formed by a sheath 3, disposed in a vertical construction formed by two parts, a lower 67 and an upper one 67', which are interconnected by a support plate 68, this sheath 3 being provided with a single differential chuck 69 with hydropneumatic control, near its opening, and by a reference jack 70-vertical transfer jack 71 assembly which acts on the lower portion of the sheath 3 with the interposition of a pressure plate 81, a hollow support 72 and the screw 73-nut 74 screwing assembly of the electrode 64. Below the differential chuck 69 there is a centering cam 75 centered on the sheath 3 and coacting with said chuck 69, and an assembly 76 to 78 for gauging the screwing force of the electrode 64 is mounted on the upper part 67' of the vertical construction.

The upper 67' and lower 67 parts of the vertical construction have the form of openwork frames covered with removable panels permitting an easy access to the various elements contained in them.

Figure 8:
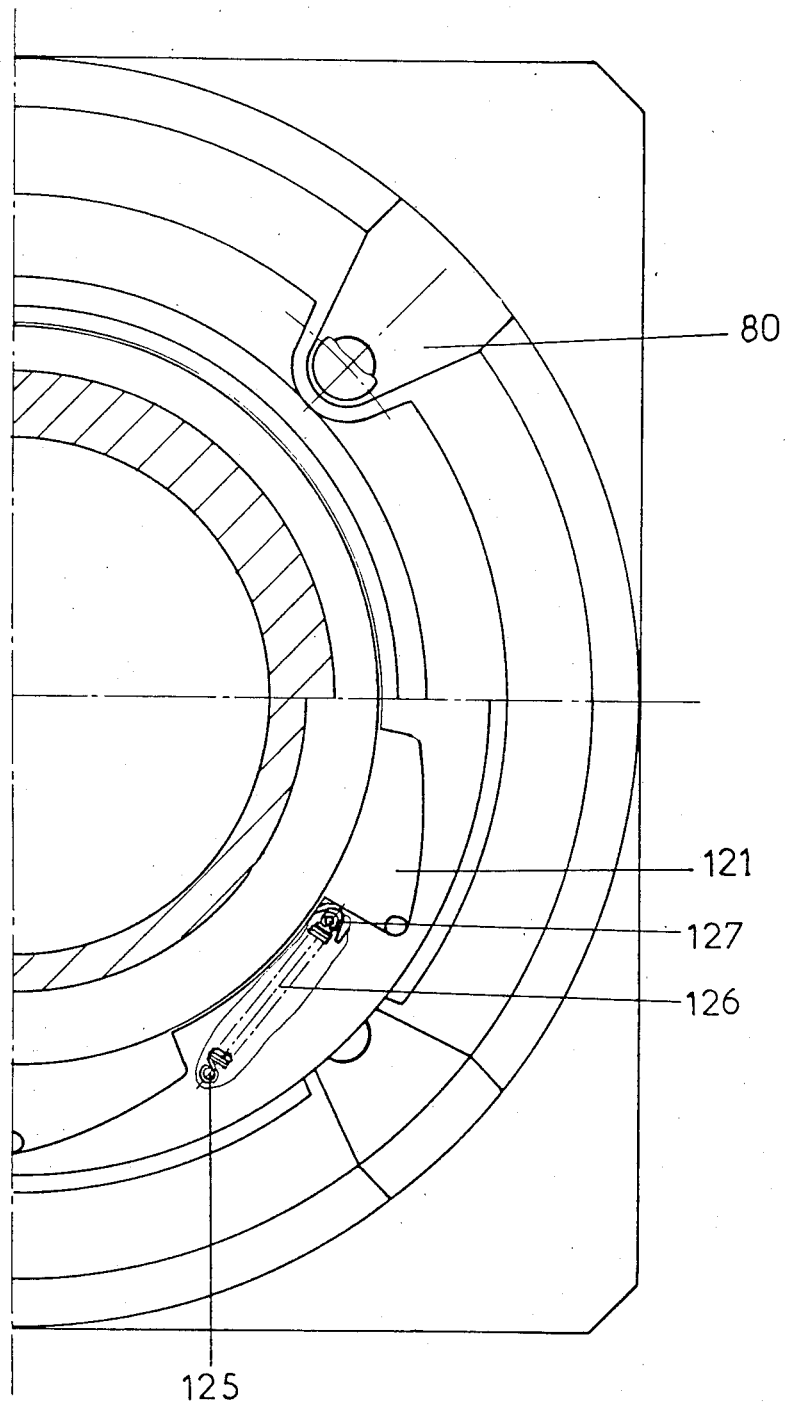
FIG. 8 is a cross-sectional half-view along the line B—B of FIG. 5.

The sheath 3 is guided in vertical translation by means of the four axles 79, which are disposed in bores of the support plate 68 and supportd at their other end by means of gussets 80 fixed to the upper part 67' of the vertical construction (FIG. 8).

At the lower portion of the sheath 3 the screw 73 is fixed which has a threading corresponding to that of the end of the electrodes 64, and which coacts a nut 74 fixed in the hollow support 72 fixed to a pressure plate 81 fixed to the reference jack 70.

The jack 71 for vertical translation is fixed on a reaction plate 82 fixed to the lower part 67 of the vertical construction and lodging two columns 83, whose upper end is supported by means of supports fixed to the construction, and which are designed to prevent the rotation of the nut 74 by means of the pressure plate 81 and the hollow support 72, the plate 81 moreover, being used as a support for eccentric brakes 84 acting on the columns 83.

The screw 73 coacting with the nut 7 is crossed by coaxial bores and it is connected to a turning joint 85 having multiple outlets, disposed in the hollow support 72, connected to a hydropneumatic pump 95 fixed to the plate 82, and guided in said support 72, without any possibility to rotate, thanks to a stem 86 fixed to the joint 85 and crossing a longitudinal groove of the support 72. On its upper part, near the end connected to the sheath 3, the screw 73 is provided with outwardly extending exit tubes 87 running along the external wall of the sheath 3 in order to converge on the feeding entrances of the control elements of the differential chuck 69.

The stem 86 is designed to limit the course of the screw 73 by acting on end-of-course devices 88, 89 fixed to the hollow support 72.

The brakes 84 are formed by a body, in which a lever 90 with an eccentric bore, is disposed, and by a control jack 92 of the lever 90. The action of these brakes 84 prevents an excessive pressure from being put on the thread ends of the electrode 64 during the last unscrewing turns.

The reference jack 70 is mounted on the jack for vertical translation 71 with the interposition of a support plate 92 which moreover carries a stem 93 crossing the pressure plate 82 and carrying an end-of-course device 94 designed to interrupt the feeding of the jack 70 as soon as said end-of-course device is operated, the support plate moreover acting on an end-of-course device 128 in the rest position of the jack 71.

On its external generatrix, the sheath 3 is provided with a welded ring 96 designed to secure a moving assembly 97 having the form of a drum connected to the sheath 3 by a driving crown 98, simultaneously fixed to the ring 96 and to a moving ring of a ball crown 99, whose stationary part is fixed to the lower face of the moving assembly 97.

The assembly for gauging the screwing force of the electrode 64 is formed by a gauge beam 76 disposed on top of the driving crown 98, centered on the ring 96 of the sheath 3, and connected, by means of two screw 100-crossbar 101 assemblies, to a control lever 102 secured to a guiding socket 103 carrying at its center the piston of a jack 104, this piston resting on a stack of resilient washers 105 guided into the bore of a control shaft 106 united to a plate 104 for fixing the jack and connected to the upper face of the moving assembly 97 by a measurement collector 77 mounted on a framework fixed to the upper face of the moving assembly 97, and by a support 78 (FIG. 7) having a half-moon form disposed in a bore in the upper face of the moving assembly 92, the flat of the support 78 being positioned on the surface of the piston of the collector 77 passing through the center of the sheath 3, the collector 77 and support 78 being diametrically opposed to each other.

Figure 7:
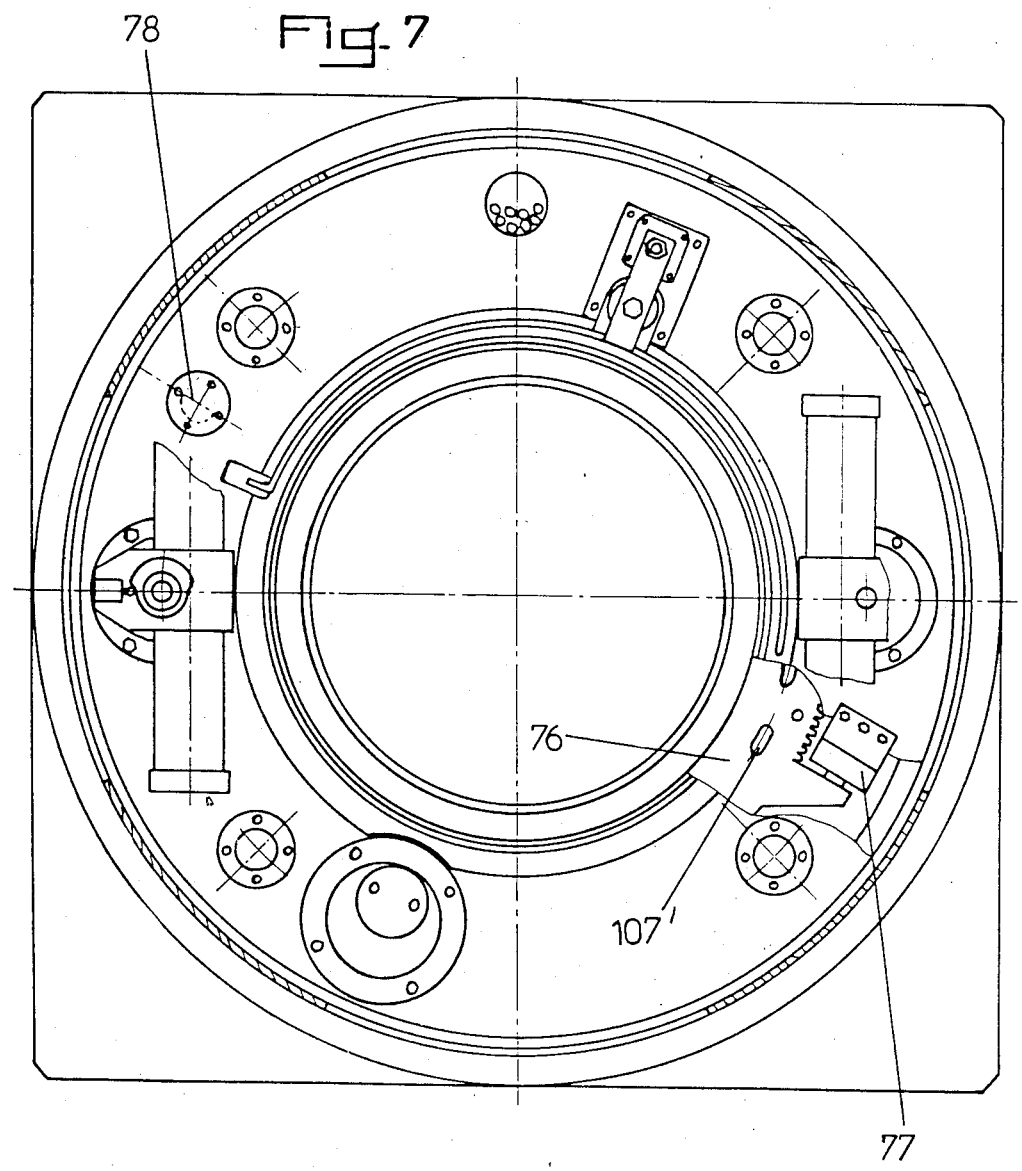
FIG. 7 is a cross-sectional view, on a larger scale, along the line A—A of FIG. 5.

The beam 76 includes two branches and is provided on one generatrix with twelve recesses 107' in which three tenons 107 fixed to the driving crown 98 are engaged upon withdrawal (FIGS. 5 and 7).

The moving assembly 97 moreover, is provided with four equally spaced bores traversing its bottom plate, and in which self-lubricating pads 108 for the passage of the axles 79 are disposed, to guide the assembly 97 in its translatory movement together with the sheath 3, and to absorb the radial reactions due to the motor effects.

On the upper face of the moving assembly 97 moreover, there is, on the one hand, a pneumatic motor 113 for driving the sheath 3 by means of the driving crown 98 for screwing the electrodes 64, as well as rotary jacks 208 for the final screwing of the electrodes 64 by means of a clutch 109 and, on the other hand, a crossbar 110 carrying on its upper side plate a ball crown 111 connected to the sheath 3 by means of tenons 112 ensuring the guiding of the sheath 3. These tenons 112 furthermore, avoid the need of rigorously adjusting the spacing of the ball crowns 111 and 99.

The differential chuck 69 is formed by a platform 114 fixed to the sheath 3 and carrying supports 115 on its upper face in which hollow cylinders 116 slide carrying rotating jaws 117 at one of their ends, by hydraulic jacks 118 lodged in the bores of the cylinders 116, fed by the hydropneumatic pump 95 by means of the rotating joint 85, and fixed to plates 119 screwed on the supports 115 and absorbing the pressure of the jacks, and by axles 120, each of them being fixed to a cylinder 116 and crossing grooves provided for in the platform 114 as well as in the bottom of the supports 115.

The centering cam 75 is mounted on the platform 114, is centered on the sheath 3 and is provided with sockets having the form of ramps 121 (FIG. 8), while connected to its lower face there are, on the one hand, two stopping means 122 designed to coact with moving supports 123 operated by jacks 124 and mounted on the upper side plate of the crossbar 110, and, on the other hand, tenons 125 for fixing one end of the return springs 126 whose other end is connected to tenons 127 fixed to the sheath 3, the springs 126 ensuring the disengagement of the cam 75 after the retraction of the moving supports 123.

The upper part 67' of the vertical construction moreover, is provided with a fixed end-of-course abutment 129 for entry of the sheath 3, and with an adjustable end-of-course abutment 130 for exit of the sheath 3 coacting, in these extreme positions, with an end-of-course device 131 fixed to the moving assembly 97.

The operating and tightening elements of the apparatus are controlled by a pneumatic control circuit formed by a starting button 132, by feed distributors 133 and 134 of the reference jack 70, by the end-of-course device 94 controlling the distributor 134 and a feed distributor 135 of the jack 71 for vertical translation, through a timer 136, two distributors 137, 138, while the timer 136 takes into account the acceleration of the ascent of the sheath 3 with the devices connected thereto by means of a differential pressure control 139, by a distributor 140 controlled by the pressure control 139, by a cell 141 functioning as a safety valve with differential timerg 136 takes into account the acceleration of the ascending of the sheath 3 with the devices connected thereto by means of a differential pressure control 139, by a distributor 140 controlled by the pressure control 139, by a cell 141 functioning as a safety valve with differential pressure, and by safety valves 142 and 143. This pneumatic control operates in the following way:

By operating the starting button 132, the distributor 133 is put into the opening position and by means of the distributor 134 it feeds the jack 70 to put it into contact with the end-of-course device 94 which controls the closing of the distributor 134 and the stopping of the feed of the jack 70, as well as the opening of the distributor 135. The latter then feeds the jack 71, and the end-if-course device 94 closes the distributors 137 and 138 by means of the timer 136. The latter takes into account the acceleration force of the ascent of the sheath 3 with the moving assembly 97, on opposite sides of the membrane of the differential pressure control 139.

The contact between two electrodes which are to be connected causes a compression in the jack 70 at one of the inputs of the pressure control 139, and the signal sent out by the latter controls the closing of the distributor 140, while the opening of the distributor 138 and the feeding of the screwing motor drive the sheath 3.

In case of compression produced by an angular displacement of the thread entry ends at the moment of screwing, the cell 141 evacuates the excess air of the jack 70 by operating as a security valve with differential pressure. At the end of the screwing cycle, the end-of-course device 88 controls the emptying of the jacks 70 and 71 by opening the distributors 133, 134, 135, 140 and 137.

Thanks to this control circuit, the stopping of the ascent of the moving assembly 97 with the sheath 3 can be performed independently of the weight of the electrodes and of the meeting point of the two electrodes which have to be screwed, within the limit of the path of the assembly 97.

Figure 10:
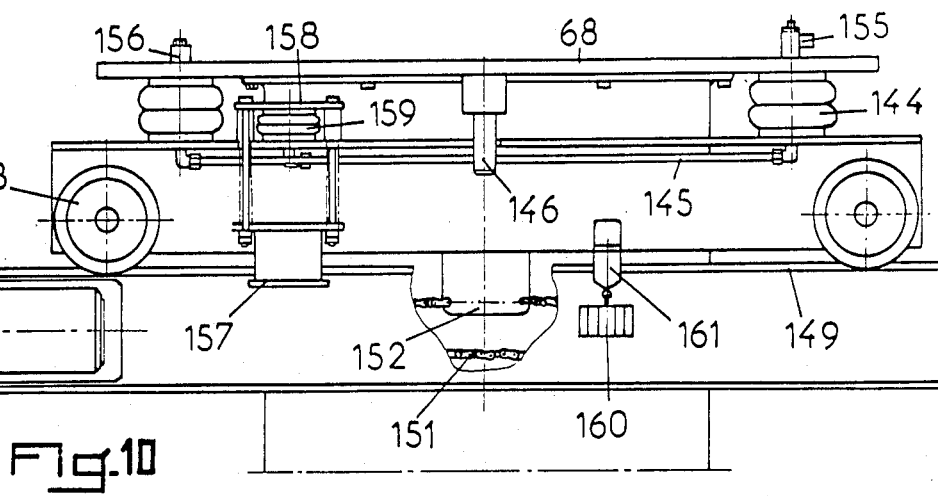
FIG. 10 is a partial view, on a larger scale, in lateral elevation, of a movable carriage of the replacement machine.

According to another characteristic of the invention, the apparatus, by means of the support plate 68, is supplied with resilient cushion 144 filled with a liquid interconnected by conduits 145 and fixed to the plate 68, and with supports 146 fixed to the plate 68, on a transport carriage formed by an angle iron frame 147 provided with rollers 148, this trolley being displaceable on a rolling path formed by rails 149 by means of a motor reducer 150 having a hollow shaft, chains 151 connected at their ends to a foot 152 fixed to the carriage, and driving and return shafts 153 provided with chain wheels 154 (FIGS. 10 and 11).

The cushions 144 are designed to correct possible alignment defects, and the upper side plate of one of the cushions is provided with a cock 155 for filling the cushion assembly, while the side plates of the other cushions are provided with a screw 156 for purging the air.

The supports 146 coact with bores provided in the angle iron wings 147 forming the carriage, and they limit the minimum height of the spacing between the support plate 68 and the carriage thanks to a shoulder provided to this end on each support, as well as the twisting angle of the apparatus on pads 244. On the one and the other side of the trolley, and parallel to the rolling path 149, brakes are provided which are designed to absorb the reaction forces due to the final screwing of the electrode, while each brake is formed by a clamp 157, the section of the braking part thereof is adapted to the section of the rolling path 149 by a pressure plate 158 connected to the clamp 157 by means of two stems crossing the upper wing of the angle iron 147 corresponding to the trolley, by a flexible jack 159 between the wing of the angle iron 147 and the pressure plate 158, and ensuring the closing of the brake, and by return springs mounted on the stems for joining the clamp 157 and the plate 158 ensuring the security of the opening of the clamp 157.

The rolling path 149 is formed by profiled rails interconnected at their ends by means of U-sections (FIG. 11), the driving and return shafts 153, on which the chain wheels 154 are fastened, being mounted near the end portions of said rails, and one of the shafts 153 being driven by the motor reducer 150.

Figure 9:
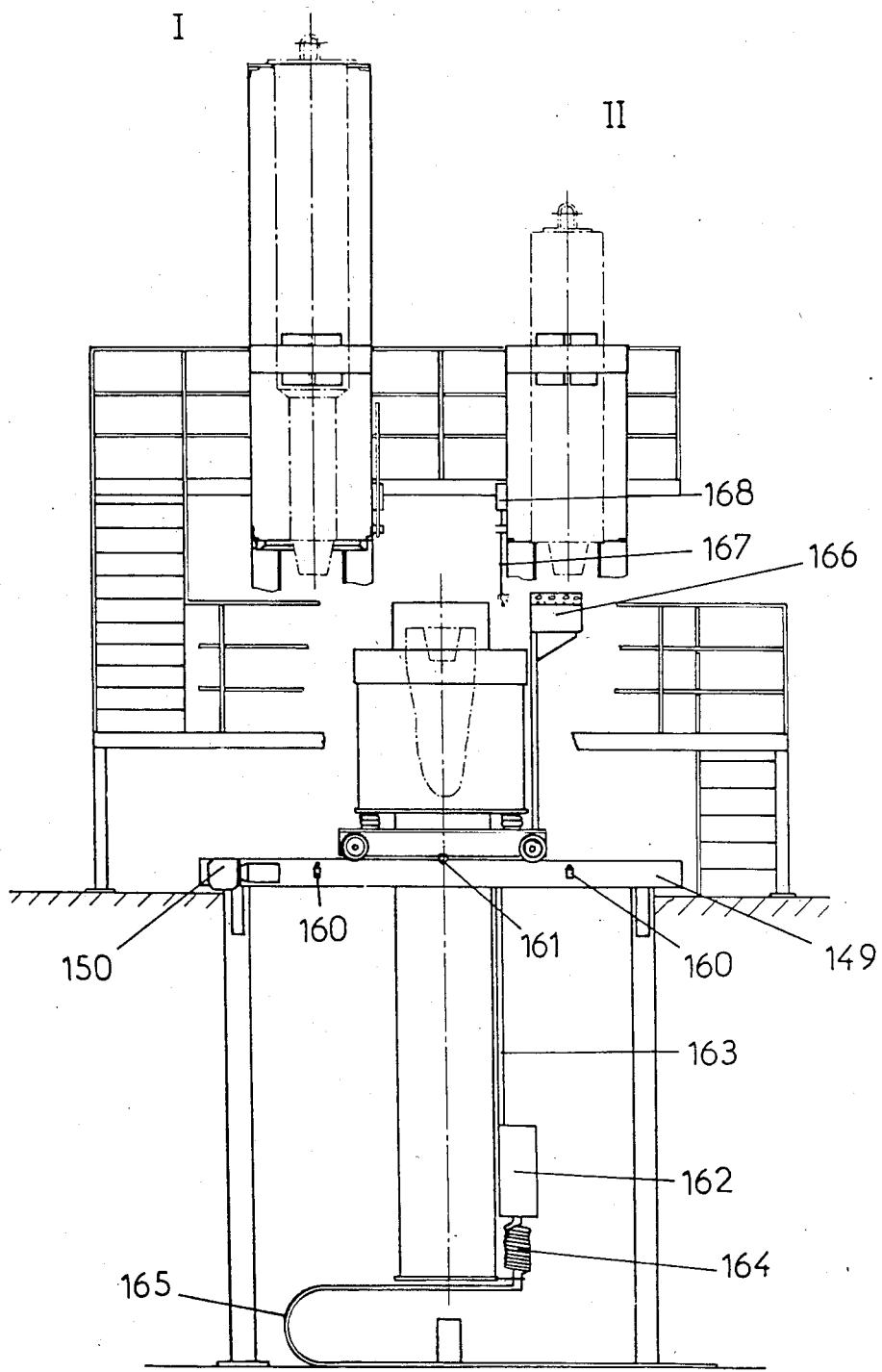
FIG. 9 is a lateral elevational view of a loading station of the electrodes.

FIG. 9 represents a loading station of the electrodes, in lateral elevation view, in which the apparatus is mounted on its carriage displaceably between two mounting stations and its displacement is controlled by means of end-of-course devices 160 each of which is the axis of a mounting station and fixed to the side of a rail of the rolling path 149, these end-of-course devices, in the extreme positions of the trolley, coacting with a cam 161 fixed to the latter and aligned with the axis of the sheath 3, the contact between the cam 161 and one of the end-of-course devices 160 cutting off the feed of the motor reducer 150 and operating the brakes.

Along the lower part 67 of the vertical construction, a control chamber 162 connected to the moving assembly 97 by means of two guiding tubes 163 fixed to said assembly 97 and crossing the support plate 68 is mounted, while the feed tubes fixed to the bottom of the apparatus are connected to the chamber 162 by means of flexible tubes having the form of springs 164.

The feeding cables and pipes of the apparatus fixed to the bottom of the latter, are disposed in a conduit 165 for carrying the cables which is also fixed to this bottom and follows the translatory movement of the apparatus.

On the upper part of the latter there is, mounted on the carriage, a control panel 166 easily accessible to an operator and including all the necessary handling and control instruments.

To ensure the cleaning of the front face and of the threading of the electrodes 64 during the transfer from one mounting station to the other, blowers 167 are provided for which are fixed to the structure of these stations by means of plates 168, these blowers being controlled as to displacement, in a known way, and the length of their blowing action being determined by a timer whose disengagement causes the stopping of the air stream and the ascent of the blowers.

The apparatus according to the invention operates in the following way:

After cooling, the electrode 64 provided with its graphite head is introduced into the apparatus provided for this purpose along the axis of the mounting station I. In order to unscrew the head, the operator, on the control panel 166, operates a control handle for unscrewing and the starting button 132, so that the jacks 70 and 71 are fed, ensuring the ascent of the moving assembly 97 guided on the axles 79. The control cylinder 183 is then engaged in the bore of the control crown of the mounting station and, when the end-of-course device 131 touches the adjustable support 130, the ascent of the sheath 3 and the assembly 97 is stopped by cutting off the feed of the jacks 70 and 71 while the jacks 91 operating the brakes 84 are fed. The end-of-course device 131 simultaneously controls the feed of the jacks 118 of the differential chuck 69 by means of the hydropneumatic pump 95. As soon as the tightening pressure of the electrode 64 is achieved, a pressure control mounted on the feeding conduit of the jacks 118 sends a signal for closing the brake 157 to 159 and for controlling the engagement of the clutches 109, this pressure control also operating the rotary jacks 108 after timing, preferably twice in order to ensure a good detachment of the head.

After this operation of the jacks 108, a cam 169 fixed to their axles comes into contact with an end-of-course device 170 which controls the starting of the motor 113 which drives the sheath 3 in rotation in the unscrewing direction. At the end of the unscrewing, the stem 86 comes into contact with the end-of-course device 89, which controls the stopping of the motor 113, the opening of the brakes 84 and the emptying of the jacks 70 and 71, while the end-of-course device 128 operated by the support plate 92 controls the opening of the jaws of the brakes 157 of the trolley after the jack 71 has returned to its starting position.

The operator then manipulates a handle causing the starting of the blowers 167 and the feed of the motor reducer 150 for transferring the assembly towards the station II. As soon as the cam 161 comes into contact with the end-of-course device 160 on the vertical axis of said station II, the motor reducer 150 is stopped and the trolley brakes are operated.

At this moment, the operator controls the screwing position and proceeds to the measurement of the couple by feeding the jack 104 which lowers the beam 76 to the axis of the measuring collector 7 by means of the lever 102. The clutches 109 are then closed, the jacks 108 are started, and the lugs 107 fixed on the driving crown 98 are engaged into the holes 107' of the beam 76, so that the latter is driven in rotation and put into contact with the collector 77 and the support 78. The value of the tightening couple is obtained by regulating the pressure of the jacks 108 by means of a known pressure regulator on the control panel 166. This value is also visible on the display of a manometer of the panel 166, and the couple value thus determined is shown on another manometer in the form of the value for regulating the disengagement contact. After this measurement, the operator cuts off the feed of the rotary jacks 108 and causes the opening of the clutches 109 as well as the ascent of the beam 76, then he operates the starting button 132 causing the feed of the reference jacks 70 and, after starting the end-of-course device 94, the stopping of the feed of the jack 70 and the pressurization of the jack 71 which follows the ascent of the sheath 3, the reference pressure being stored in the differential pressure control 139.

The contact between the electrodes 64 which have to be screwed causes a compression in the reference jack 70 transmitted to the pressure control 139, which sends an output signal cutting off the feed of the jack 71 and controlling the starting of the screwing motor 113 driving the sheath 3. At the end of the screwing, a pressure control mounted on the feed conduit of the jack 113 cuts off the feed of the latter, controls the closing of the brakes 157 to 159 of the trolley, and the engagement of the clutches 109, and then, after timing, the starting of the rotary jacks 108 in order to obtain the final screwing couple.

As soon as the couple is achieved, the contact manometer sends a signal stopping the feed of the jacks 108 and starting, after timing, the opening of the clutches 109, this timing also operating the withdrawal of the jaws 117 by means of the jacks 118, as well as the emptying of the jacks 70 and 71 driving the lowering of the sheath 3. The complete emptying of the jack 71 moreover, has the effect of bringing the support plate 92 into contact with the end-of-course device 128 which causes the opening of the brake clamps 157 acting against the rolling track 149.

The new electrode is introduced point first into the apparatus for replacement by means of a traversing hoist. When the upper front face of the electrode is at the level of the control cylinder 183, the operator starts a screwing operation on the panel 166 and causes, on the one hand, a timed feed of the motor 113 at a low pressure, which sets the sheath 3 in rotation and, on the other hand, the exit of the moving support 123, as well as the feed, after timing, of the jacks 118 by means of the pump 95.

The contact of the moving supports 123 with the fixed supports 122 of the cam 75 stops the rotation of the latter and drives in translatory movement of the hollow cylinders 116. As soon as the tightening pressure is reached, a pressure control mounted on the feed conduit of the jacks 116 starts the disengagement of the moving supports 123, the electrode 64 then being ready to be transferred to the station I in order to be screwed there. This screwing cycle is identical to the one previously mentioned.

Figure 12:
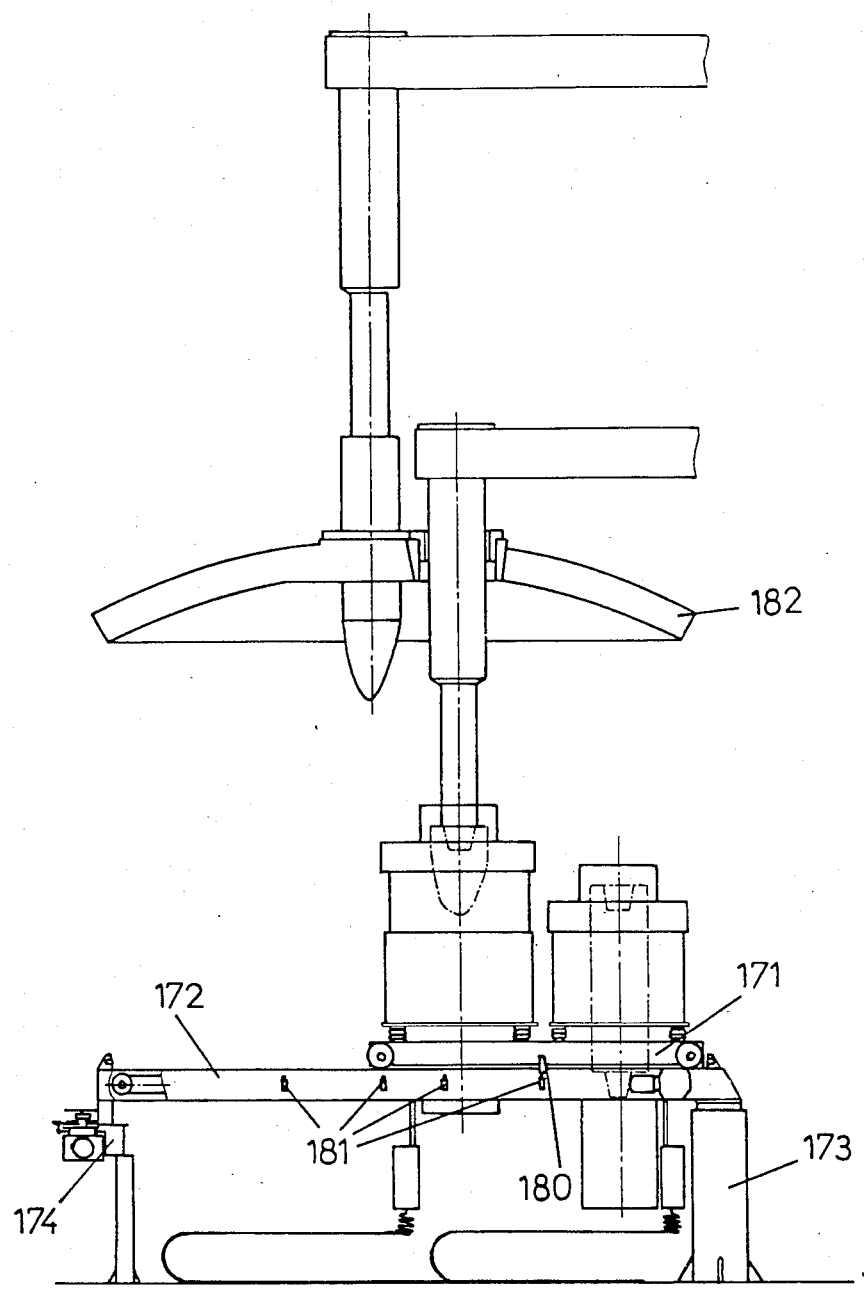
FIG. 12 is a lateral elevation view of a different loading station of the electrodes.
Figure 13:
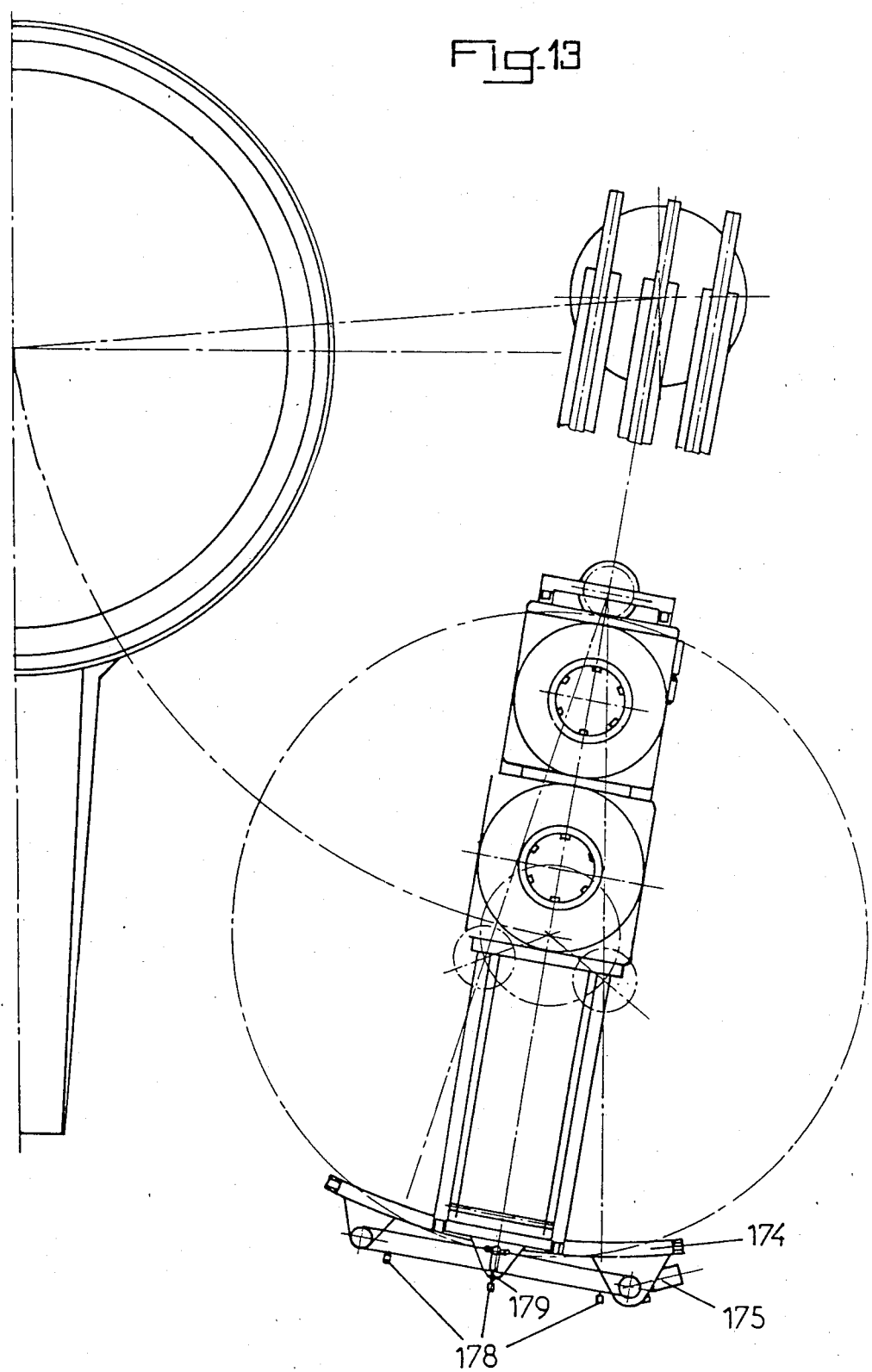
FIG. 13 is a plan view corresponding to FIG. 12.

FIGS. 12 and 13 represent a different adaptation of the apparatus for replacement from below for use near the furnace without dismounting the electrode 64. To this end, two identical apparatus are mounted next to each other on a trolley 171 displaceable along a rolling track 172, which can be pivoted at one of its ends around a vertical arm 173, while its other end is guided along a curvilinear rail 174, and is driven on this rail by means of a motor reducer 175, chain wheels 176 and a chain 177 connected to said end.

On the curvilinear rail 174 there are end-of-course devices 178 permitting the alignment of the symmetry axis of the rolling track 172 of the trolley 171, in cooperation with a cam 179 fixed to said rolling track 172 with the axis of the electrode to be unscrewed or replaced (FIG. 13) and the alignment of the apparatus with the axis of the electrodes is defined by the contact of a cam 180, fixed to the trolley 171, with end-of-course devices 181 on the side of one of the rails of the rolling track 172. For movable hearth furnaces, the assembly of the apparatus can be made movable for utilization under the vault.

For such a utilization near the furnace, the sheath 3, attached to the apparatus for unscrewing and screwing the head, has a double wall and advantageously includes an intermediate insulation as well as an air injecting device at its bottom creating a forced convection between the head which has to be screwed and unscrewed and the sheath wall, and the supports of the jaws of said apparatus are provided with a cooling system fed through the rotating joint 85, while the apparatus for screwing an electrode 64 includes the centering elements of said electrode, and the assembly of the device formed in this way is protected from the radiation of the vault by a carapace made of ceramic fibers, not shown, fixed to the trolley 171 and having two openings above the sheaths 3 of each apparatus.

Figure 14:
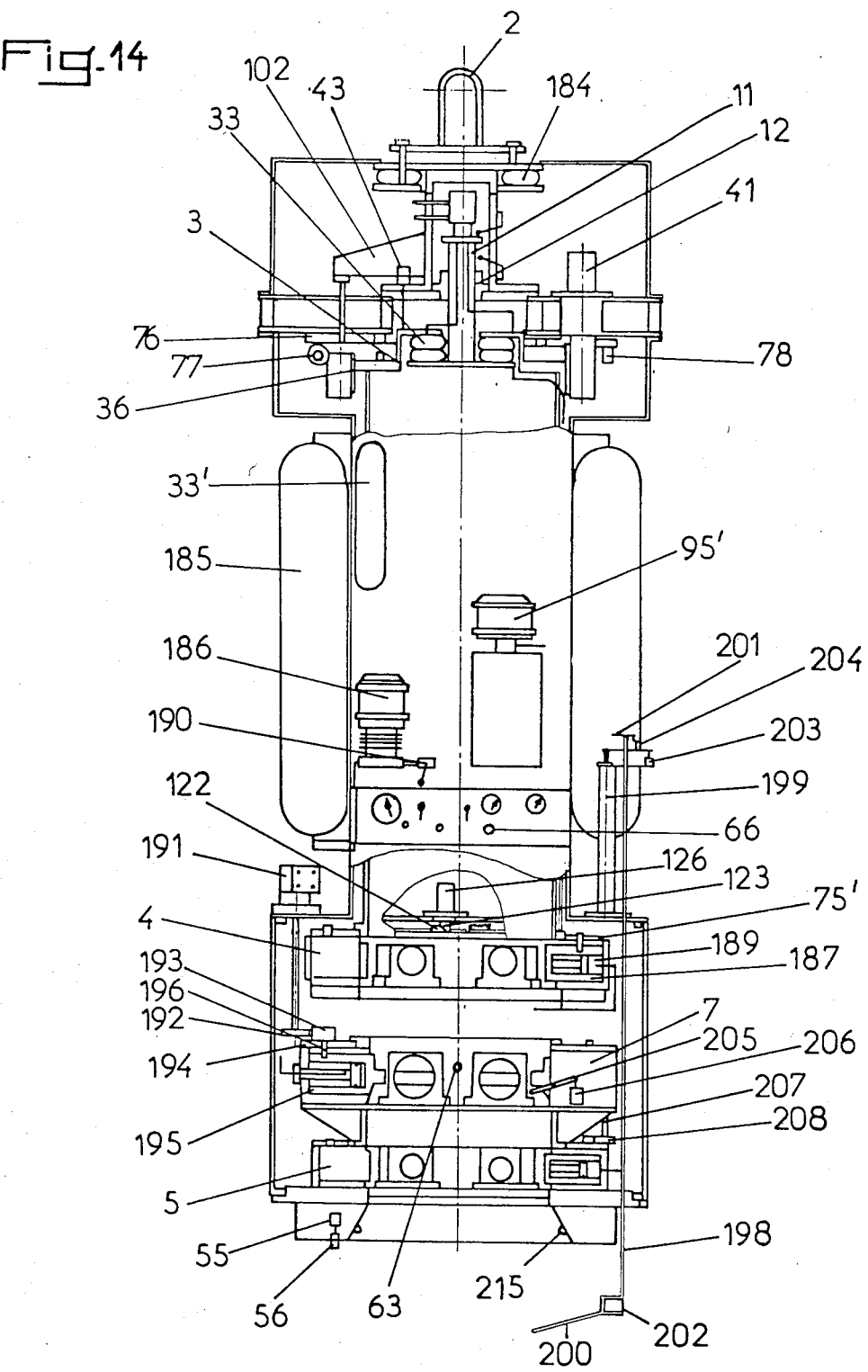
FIG. 14 is a lateral elevation view, partially in cross section, of another embodiment of the invention.

FIG. 14 represents a different embodiment of the invention for the adaptation of the apparatus for replacing the electrodes from the top, in which the body 1 for housing the sheath 3 is connected to the hooking handle 2 for a hook of a traversing hoist by means of pneumatic springs 184. The latter ensure an elastic convection, permitting a yielding contact with the column of electrodes of the furnace.

The upper 4 and lower 5 tightening chucks, as well as the centering chuck 7 are controlled hydropneumatically by means of a pump 95' through a pneumatic control circuit, whose feed is ensured by compressed air tanks 185 which are periodically filled by means of a compressor 186. These tanks 185 ensure that the apparatus is sustained for several replacement cycles.

Figure 15:
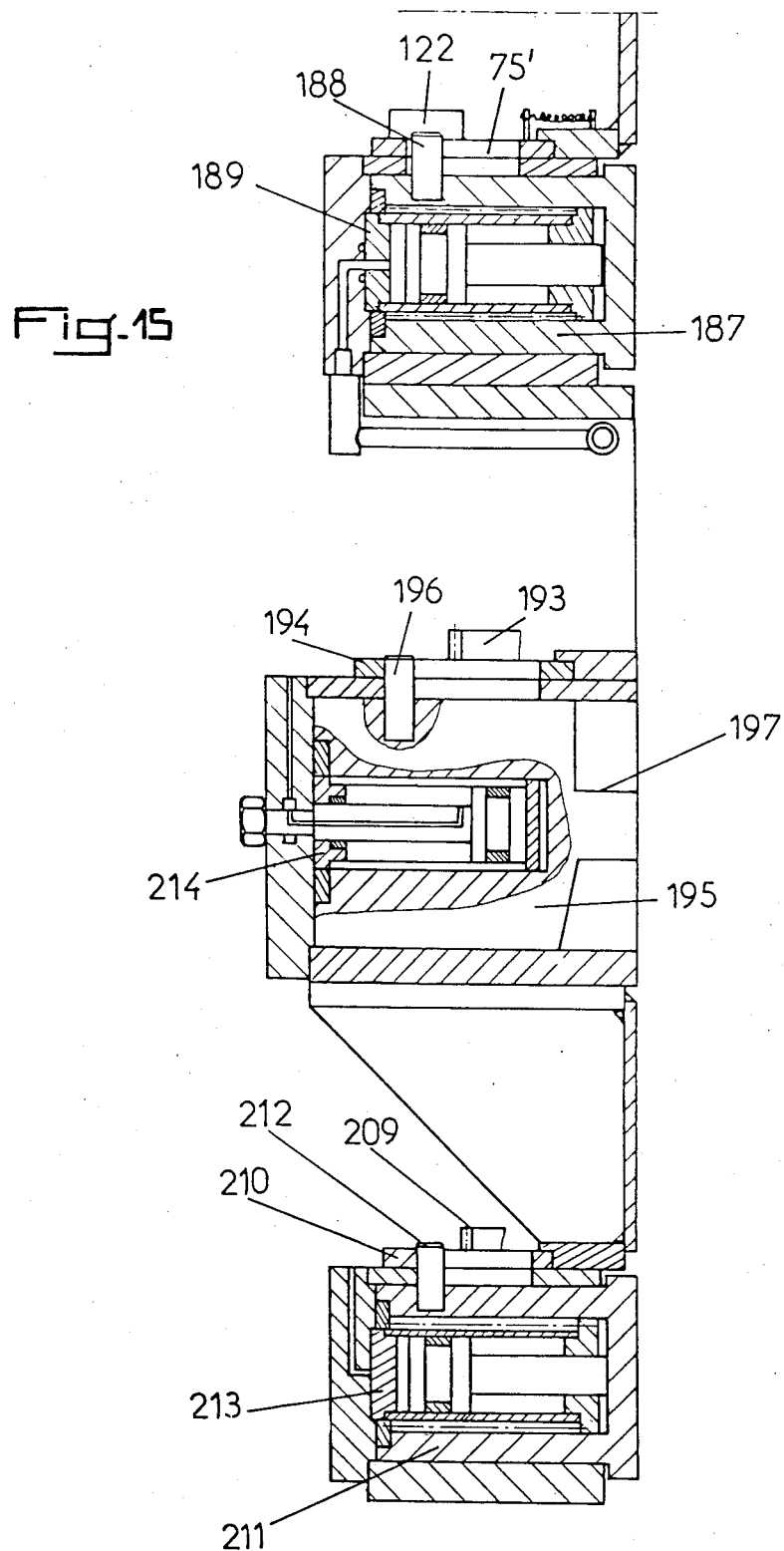
FIG. 15 is a partial cross-sectional view of the chucks.

The upper chuck 4 coacts with a centering cam 75' analogous to the cam 75 of the apparatus according to FIGS. 5, 7 and 8. In this way, the fixing of the electrode begins after starting the apparatus by means of a button 66, the brake operating on the driving crown 36 of the sheath 3 is set free and the motor 41 for driving said sheath 3 is fed under low pressure, the jacks 124 of the moving supports 123 being simultaneously fed and operating the supports to bring them into contact with the stops 122 fixed to the cam 75'. These stops stop the rotation of the cam 75', causing the translation of the jaws 187 of the chuck 4 under the action of the axles 188 which slide along the ramps of the cam 75' (FIG. 15).

As soon as the jaws 187 come into contact with the piece to be gripped, the motor 41 is blocked and the pressure control mounted on its feeding conduit controls the closing of the brake operating on the driving crown 36 as well as the starting of the hydropneumatic pump 95'. The jacks 189 in the bores of the jaws 187 are then fed for the final gripping of the piece (FIG. 15), and a pressure control mounted on the feeding conduit of said jacks 187 controls the pressurization of the flexible jacks 33 and their buffer tank 33'. When the pressure in the flexible jacks 33 becomes greater than the weight of the assembly, it causes the ascent of the sheath 3 which releases an end-of-course device 43 operating at the same time the starting of an end-of-cycle signal and the closing of the feed of the jacks 33, ensuring in this way an equilibrated suspension of the electrode 64 independently of its weight.

Moreover, above the sheath 3 there is an assembly 76 to 78 for measuring the screwing force of the electrodes, whose beam 76 is vertically displaceable by means of a driving lever 102 to which it is connected, and which is operated by a jack, this beam 76 coacting, in the gauging position, with tenons 107 fixed to the driving crown 36, as well as with a measurement collector 77 and a support 78 (FIG. 14).

This measuring assembly is identical, in its construction and operation, to that described in relation to the apparatus for replacement from the bottom (FIG. 5).

In the case of replacement from the top, a measurement can be carried out after the appearance of an end-of-cycle signal controlled by the end-of-course device 43.

For movement above the furnace, the compressor 186 which is provided with a vented cock 190 having three passages is disconnected from the compressed air circuit to which it is joined by a flexible connection, and its cock 190 is closed.

When lifting the apparatus, the stem 56 of its timed end-of-course device 55 simultaneously controls the verification of the closing of the brake operating on the driving crown 36 and the closing of the centering chuck 7.

The latter is operated by a rotary jack 191, whose axle drives a pinion 192 fixed to the chuck 7 and registering with a toothed sector 193 fixed to a cam 194 ensuring the movement of the jaws 195 of the chuck by means of axles 196 sliding along the ramps of the cam 194 (FIGS. 14 and 15). In this way, the jaws 195 are brought into contact with the electrode, and their flat part 197 is disposed under the latter in order to avoid any risk of accidental exit of said electrode during its transportation.

Moreover, the apparatus according to the invention is provided with a vertical axle 198 operated by a jack 199 controlled simultaneously with the closing of the centering chuck 7 by the contact 55 with adjustable timing, and an axle 198 having, on the one hand, on its lower end, a stem 200 inclined with respect to the horizontal and connected to a moving support 201, fixed to the other end of the axle 198, by means of a cable 202, and, on the other hand, on its upper end by a support for starting a control contact 203 of a rotary jack connected to the axis 198 and imparting to it a rotation of a circular arc in order to place its contact stem 200 into the axis of the apparatus.

When the apparatus is lowered, as soon as the stem 200 touches the electrode, the support 201 operates a switch 204 to start the blowers 215 as well as the withdrawal of the stem 200, by reverse rotation of the rotary jack for driving the axle 198, the end of the rotation course of the jack controlling the return of the axle 198 by means of the jack 199 by a contact on the housing of said rotary jack.

One of the jaws 195 of the centering chuck 7 is provided with a valve stem 205 of a distributor 206 operating, by contact with the front face of the electrode, a rotary jack for closing the lower tightening chuck 5 by means of an axle 207 driving a pinion 208 fixed to the chuck 5 and registering with a toothed sector 209 fixed to a cam 210, which ensures the translatory movement of the jaws 211 by means of axles 212 sliding along the ramps of the cam 210, each of these jaws housing a hydraulic jack 213 fed, after the contact of the jaws with the electrode, by the hydropneumatic pump 95', controlled by a pressure control mounted on the feeding conduit of the rotary jack, this pressure control simultaneously controlling the opening of the centering chuck 7 and the pressurization of the hydraulic jacks 213, housed in the jaws 195 by means of the pump 95'.

A pressure control mounted on the feeding conduit of the jacks 213 simultaneously controls the opening of the brake operating on the driving crown 36, as well as the starting of the blowers 63 which create an air stream at the level of the contact surfaces of the electrodes which have to be assembled, and the starting of the motor 41 for driving the sheath 3 which at the same time performs a vertical translatory movement thanks to its screw 11-nut 12 assembly.

The operation of the apparatus for screwing or unscrewing the electrode is identical to that described in relation to the embodiment according to FIGS. 1 to 4 or of an apparatus for replacement from the bottom.

In order vertically to displace an electrode column inside a claw, it is sufficient for the operator to cause the closing of the centering chuck 7 and to suppress the screwing functions as well as the action of the blowers. The apparatus is then displaced above the furnace, then it is lowered onto the electode column. As soon as the valve stem 205 of the distributor 206 comes into contact with the upper face of the electrode, the lower chuck 5 is closed, the inclined stem 200 is removed by means of the axle 198, and a sound signal is sent, while the operator then starts the opening and ascent of the claw. When the latter comes into contact with the stem 200, a sound signal simultaneously forewarns the operator to proceed with the closing of the claw, and a timing is started, at the end of which the chuck 5 is opened and sends an end-of-cycle signal.

Figure 16:
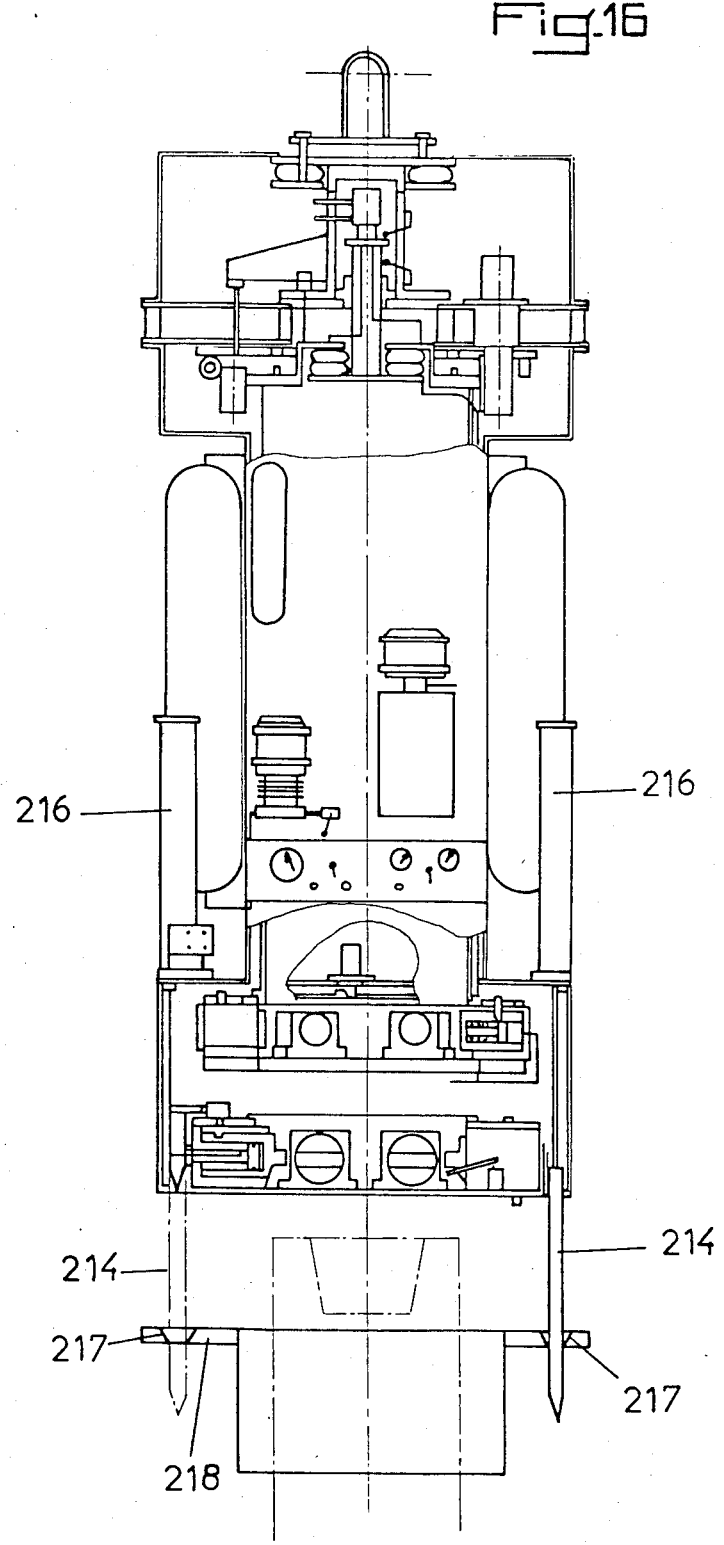
FIG. 16 represents in lateral elevation and partially in cross section a different embodiment of the apparatus according to FIG. 14.

FIG. 16 shows a different embodiment of the invention, in which the lower tightening chuck 5 is replaced by a pair of centering heads 214, which are retractable by means of jacks 216 and coacting with the corresponding bores 217 of a side plate 218 fixed to the support of the electrode or to the claw of the electrode.

Figure 17:
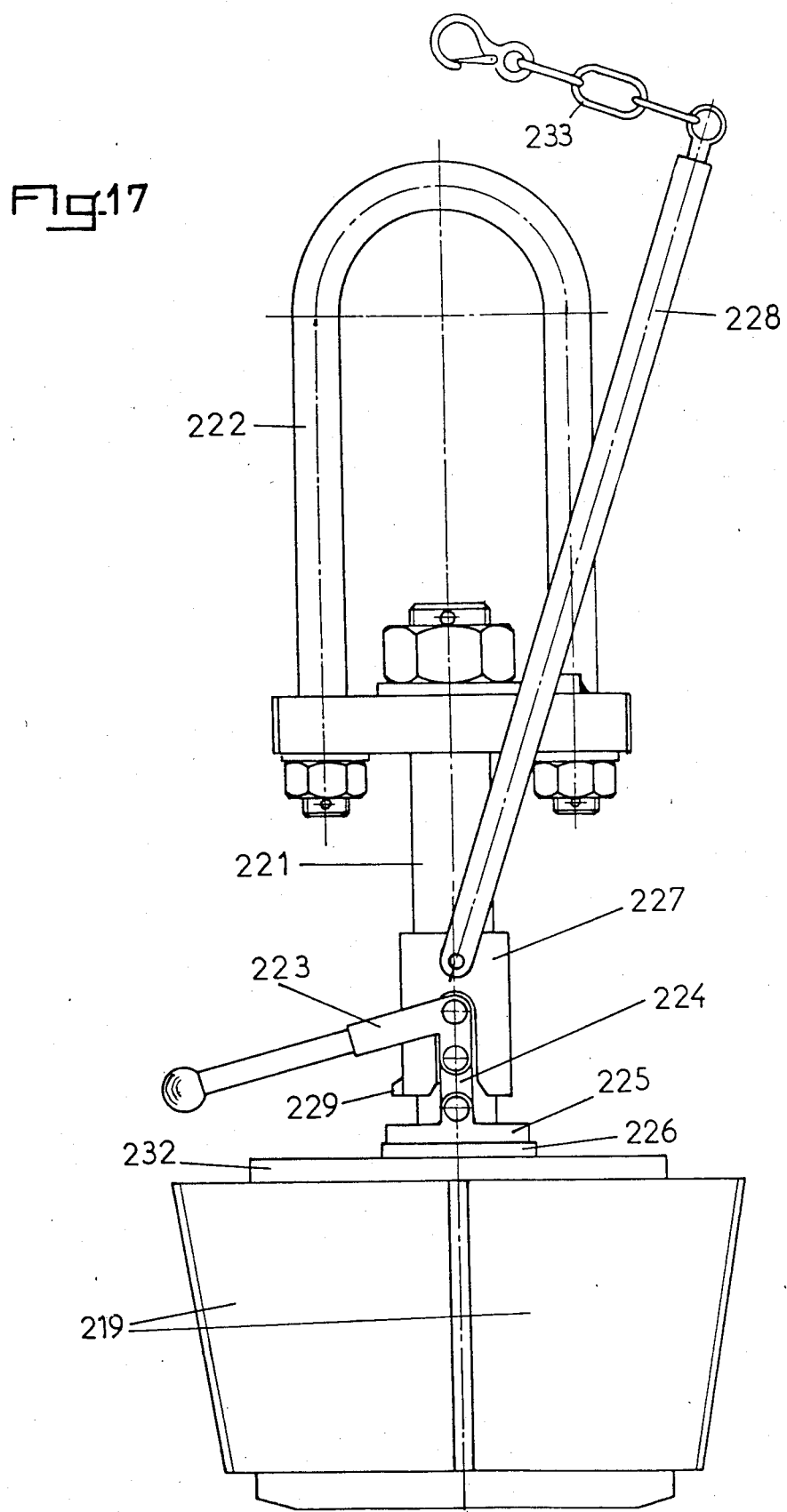
FIG. 17 is a lateral elevational view of a transport hanger.
Figure 18:
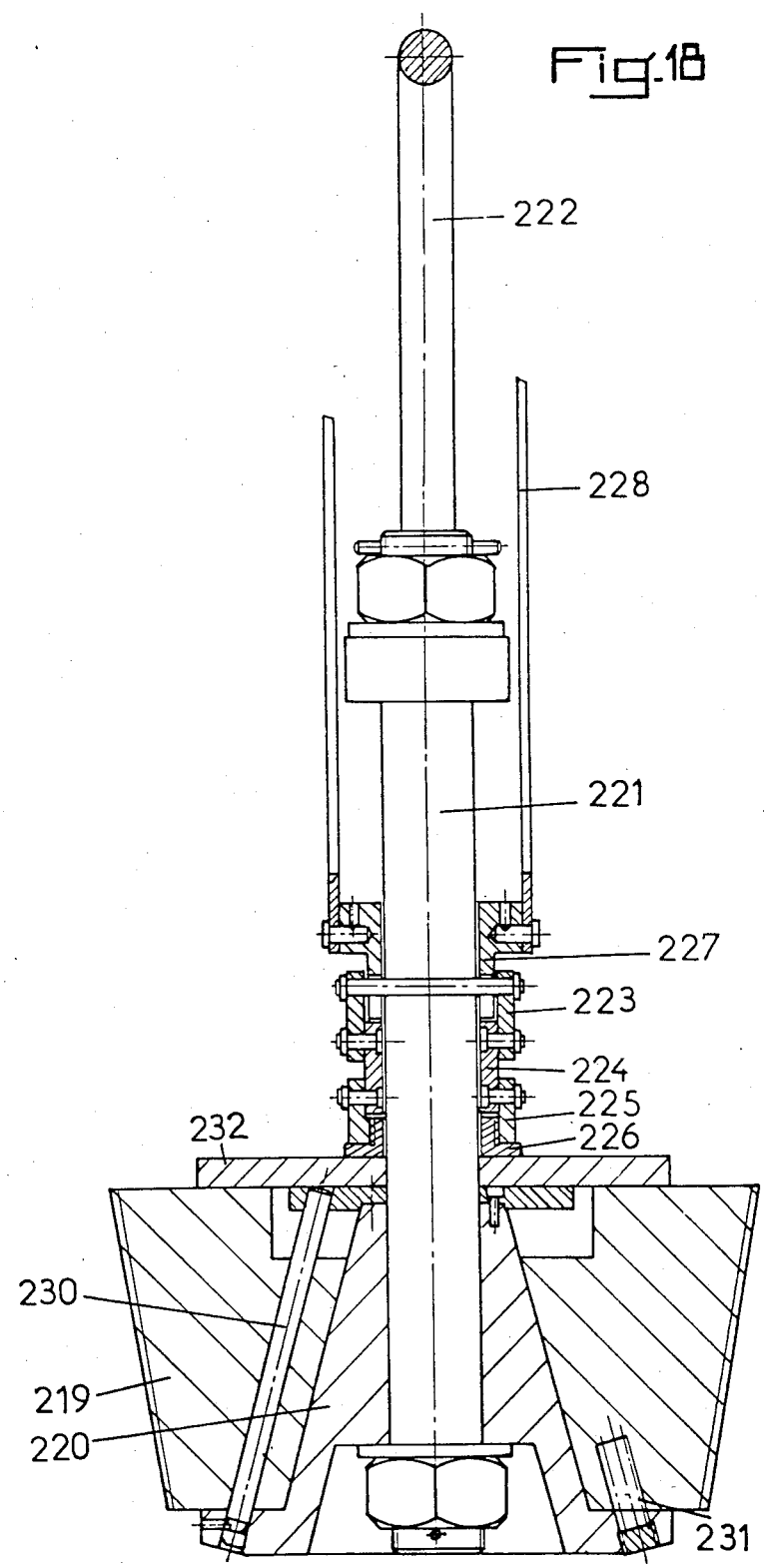
FIG. 18 is an elevational view in cross section according to FIG. 17.

The invention also has as its object a transport hanger for electrodes of electric arc furnaces characterized in that it is retractable and is basically formed by threaded jaws 219 mounted on a conical ramp 220 having the possibility of sliding, by means of axles 230 against the action of springs 231, by a shaft 221 fixed to a hooking handle 222 for a hook of a traversing hoist, by an assembly for locking the jaws 219 in operating position including a joint formed by a cranked lever 223 coacting with small rods 224 and operating a pusher 225 provided with a socket for regulating the tightening, by an intermediate plate 232 disposed under the pusher 225 and by a moving ring 227 for locking the small rods 224 provided, on the one hand, with an operating handle 228 with a hooking chain 233 for a chain link of a traversing hoist and, on the other hand, with an unblocking lug 229 for the lever 223 of the joint (FIGS. 17 and 18).

Before screwing in the electrode, the hanger is cocked by pressing on the lever 223 which presses, by means of the small rods 224 and the pusher 225, on the intermediate plate 232 which makes the jaws 219 slide into abutment against the lower face of the conical ramp 220 by compressing the springs 231.

For the transport of a column, the hanger is simply screwed into the female threading of the upper electrode of the column, then the hook of the traversing hoist is passed into the handle 222 and the chain 233 is hooked to a chain link of said traversing hoist.

The column of electrodes can thus be transferred to the level of the furnace, then fixed to the clamp which carries the electrode. After disengaging the hook of the traversing hoist from the handle 222, only the chain 233 remains hooked to the chain of the traversing hoist, and the ascent of the latter causes the tensioning of said chain 233 causing the rising of the moving ring 227, whose unlocking lug 229 lifts the lever 223 so that the ramp 220-shaft 221-handle 222 assembly is lowered with a simultaneous action of the springs 231, causing the disengagement of the jaws 219 and allowing retracting the hanger.

Such a transport hanger permits avoiding any kind of human intervention at the level of the furnace, and its use is especially interesting for the positioning of electrode parts as well as in combination with the apparatus for replacement from below.

Of course, the invention is not limited to the described embodiments represented in the accompanying drawings. Modifications and possible, especially of the construction of the various elements or by substitution of equivalents without however departing from the scope of protection of the invention.

I claim:

1. Machine for replacing electrodes of electric arc furnaces, comprising a body (1) having a handle (2) for engagement by a hook of a traversing hoist, a sheath (3) disposed in the body (1) and having two gripping chucks, respectively an upper (4) and a lower (5), and a device (6) for driving in rotation the sheath (3), the sheath (3) having, between its gripping chucks, a centering chuck (7), the upper chuck (4) having an expansible support (8) limiting its opening, the device (6) for driving in rotation the sheath (3) comprising a screw (11)-nut (12) assembly for moving in translation the sheath (3), motors (13) for the final screwing of the electrode, a device (14) for driving in rotation and for braking the sheath (3), and means for pneumatically operating the machine.

2. Machine according to claim 1, characterized in that the centering chuck (7) is constituted by jaws (15) with an internal shoulder (15''), which engage with their rear face a toothed spiral (16), whose teeth coact with a pinion (17) of a drive shaft of a pneumatic motor (18), plates (19) and (20) secured to the body (1), and serving respectively as a support for the motor (18) and for centering and guiding the toothed spiral (16), and for guiding the jaws (15), an assembly of a support (21)-end-of-course (22) for opening the jaws (15), and a support (23)-control rod (24)-end-of-course contact (25) assembly for the approach of the loaded machine to an electrode in service.

3. Machine according to claim 2, characterized in that the jaws (15) are provided each with a foot (15') protruding in the direction of the lower gripping chuck (5) and inclined outwardly relative to the axis of the sheath (3) at an angle corresponding to the angle of inclination of the screw-threaded portion of the end of the electrode, and the internal shoulder (15'') forms a safety wedge for transport and has a thickness such that any contact between the screw threads of the electrodes to be assembled will be avoided.

4. Machine according to claim 1, characterized in that the screw (11) of the screw (11)-nut (12) assembly for displacing in translation the sheath (3) is secured to the latter by means of flexible jacks (33), connected to a buffer tank (33'), and coacting with a drum (34) secured to a plate (25) at the upper end of the sheath (3), this plate bearing a toothed ring (36) to be driven in rotation coacting with the motors (13) and with the device (14).

5. Machine according to claim 1, characterized in that the nut (12) is secured to the body (1) which also bears on the other hand the motors (3) for final screwing of the electrode, which are in the form of connecting jacks (37) provided each with a toothed clutch (38) and a drive pinion (39) coacting with a toothed crown (36), and on the other hand the device (14) for driving in rotation and braking the sheath (3) is constituted by a pinion (40) for driving the sheath (3), secured to a pneumatic motor (41), and by brake (42) interposed between the motor (41) and the pinion (40).

6. Machine according to claim 1, characterized in that the nut (12) is provided with an end-of-course contact (43) detecting the vertical displacement of the sheath (3) under the effect of inflation of flexible jacks (33), which actuate a drum (34), and on a lifting shaft (44) secured to the nut (12) and the lifting handle (2) are provided upper and lower end-of-course contacts (45) and (46) of the screw (11), which coact with a washer (47) secured to the latter.

7. Machine according to claim 1, characterized in that the drive shaft of at least one pinion (39) of a motor (13) has a cam (48) coacting with an end-of-course contact (49) for limitation of the rotation of the pinion (39), which is in circuit with a timed pressure control preset to a value slightly less than that of the gripping couple necessary between the electrodes, and which actuates after a delay a clutch (38) of a jack and controls the return of this latter if said couple is not attained, so as to repeat the gripping until the couple is attained.

8. Machine according to claim 4, characterized in that the feeding with compressed air of the flexible jacks (33) and of the buffer reservoir (33') is effected by a conduit coaxial with the screw (11) which is provided with a rotatable connection (50) connected to a principal compressed air feed conduit, which is connected either to a compressor on the traversing hoist through a flexible conduit, or to a container under pressure provided in or on the body (1).

9. Machine according to claim 1, characterized in that the upper chuck (4) is moreover provided with a retractable end-of-course contact (51) actuated by a jack (52), and controlling the opening of the lower chuck (5) as well as a timer for raising the sheath (3) to its point of departure after an operation of screwing the electrode.

10. Machine according to claim 1, characterized in that the lower chuck (5) is provided, on the one hand, on the periphery of a guide part (53), with blowers (54) whose time of functioning is limited by a timer, and whose actuation is controlled by a timed interrupter (55) actuated by a rod (56) protruding from the lower portion of the chuck (5), and on the other hand with an end-of-course contact (57) for opening jaws (58) coacting by means of a rod (59) with a cam (60) secured to a jaw (58), the jaws (58) being provided moreover each with an abutment (61) coacting with a corresponding recess of a guide plate (62).

11. Machine according to claim 2, characterized in that the sheath (3) is provided about its periphery, at the level of the shoulders (15″) of the jaws (15) of the centering chuck (7), with blowers (63), whose actuation is controlled by a timer by the end-of-course contact (22) for opening the jaws, and whose period of operation is controlled by another timer as needed.

12. Machine according to claim 1, characterized in that for replacing electrodes from below, the sheath (3) is disposed in a vertical frame in two lower (67) and upper (67′) portions interconnected by a support plate (68), and provided near its opening with a single differential chuck (69) hydropneumatically controlled, a reference jack (70)-vertical translatory jack (71) assembly acting on the lower portion of the sheath (3) by means of a pressure plate (81), a hollow support (72) and a screw (73)-nut (74) assembly for screwing the electrode (64), a centering cam (75) centered on the sheath (3) and coacting with the differential chuck (69), and an assembly (76, 77, 78) for measuring the screwing force of the electrode (64) mounted on the upper portion (67′) of the vertical frame.

13. Machine according to claim 12, characterized in that the jack (71) for vertical translatory movement is secured on a reaction plate (82) secured to the lower portion (67) of the vertical frame and housing two columns (83), whose upper end is maintained by means of supports secured to the frame, and which act to prevent the gyration of the nut (74) by means of a pressure plate (81) and the hollow support (72), the plate (81) serving moreover to support eccentric brakes (84) acting on the columns (83).

14. Machine according to claim 12, characterized in that the screw (73), coacting with the nut (74), is traversed by coaxial bores and is connected to a turnable coupling (85) with multiple orifices, disposed in the hollow support (72), connected to a hydropneumatic pump (95) secured on the plate (81), and guided in said support (72), without the possibility of rotation, thanks to a rod (86) secured to the coupling (85) and traversing a longitudinal groove in the support (72), the screw (73) being provided, at its upper part, near an end of the screw (73) connected to the sheath (3), with outlet tubes (87) extending radially and which extend along the exterior wall of the sheath (3) to terminate at feed entrances of control means for the differential chuck (69).

15. Machine according to claim 12, characterized in that the reference jack (70) is mounted on the vertical translatory movement jack (71) by a support plate (92), which also carries a rod (93) traversing the pressure plate (81) and carrying an end-of-course device (94) adapted to interrupt the feed to the jack (70), as soon as said end-of-course device is actuated, the support plate acting moreover in the rest position of the jack (71) on an end-of-course device (128).

16. Machine according to claim 13, characterized in that on its external generatrix, the sheath (3) is provided with a welded ring (96) which serves for the securement of a mobile assembly (97) in the form of a drum connected to the sheath (3) by a drive crown (98) secured also to the ring (96) and to a movable ring of a circular ball bearing (99), whose stationary part is secured to the lower surface of the movable assembly (97).

17. Machine according to claim 12, characterized in that the assembly for measuring the screwing force of the electrode (64) is constituted by a measuring beam (76) disposed above the drive crown (98), centered on the ring (96) of the sheath (3), and connected by two screw (100)-crossbar (101) assemblies to a control lever (101) welded to a guide socket (103) carrying at its center the piston of a jack (104), this piston resting on stacked resilient rings (105) guided in the bore of a guide shaft (106) welded to the securement plate of the jack (104) and connected to the upper face of the movable assembly (97), a measuring collector (97) mounted on a frame secured to the upper face of the movable assembly (97), and an abutment (78) in the shape of a half-moon disposed in a recess provided in the upper face of the movable assembly (97), a flat of the abutment (78) being positioned in the plane of the piston of the collector (77) passing through the center of the sheath (3), the collector (77) and abutment (78) being diametrically opposed, and the beam (76) comprising two branches and being provided on one generatrix with twelve holes (107′) in which engage, during measurement, three lugs (107) secured to the drive crown (98).

18. Machine according to claim 16, characterized in that on the upper face of the movable assembly (97) are disposed moreover on the one hand a pneumatic motor (113) for driving the sheath (3) by means of the drive crown (98) for screwing the electrodes (64), as well as rotatable jacks (108) for final screwing of the electrodes (64) by means of clutches (109), and on the other hand a crossbar (110) carrying on its upper flange a circular ball bearing (111) connected to the sheath (3) by lugs (112) ensuring the guidance of the sheath (3).

19. Machine according to claim 12, characterized in that the differential chuck (69) is constituted by a plate (114) secured to the sheath (3) and carrying on its upper face supports (115), in which slide hollow cylinders (116) bearing at one of their ends pivoting jaws (117), hydraulic jacks (118) disposed in recesses of the cylinders (116), fed by a hydropneumatic pump (95) through the rotatable coupling (85) and secured to plates (119) screwed on the supports (115) and absorbing the force of the jacks, and axles (120) each secured to a cylinder (116) and traversing grooves provided in the plate (114) as well as in the base of the supports (115).

20. A machine according to claim 19, characterized in that the centering cam (75) is mounted below the plate (114), is centered on the sheath (3), and is provided with seats in the form of ramps (121), and on its lower face is welded on the one hand to stops (122) adapted to coact with movable abutments (123) actuated by jacks (124) and mounted on the upper flange of the crosspiece (110), and on the other hand to lugs (125) for securement of an end of return springs (126) whose other end is connected to lugs (127) secured to the sheath (3), the springs (126) ensuring the disengagement of the cam (75) after retraction of the movable abutments (123).

21. Machine according to claim 12, characterized in that a actuating members and gripping members of the machine are actuated by a pneumatic control circuit constituted by a start button (132), distributors (133 and 134) for feeding a reference chuck (30), an end-of-course device (94) controlling a distributor (134, 135) for feeding the vertical translatory movement jack (71), through a timer (136), to distributors (137, 138), the timer (136) taking account of the acceleration of the rising of the sheath (3) with the devices connected thereto by means of a differential pressure control (139), a distributor (140) controlled by the pressure control (139), a cell (141) serving as a differential pressure safety valve, and safety valves (142 and 143).

22. Machine according to claim 12, characterized in that it is raised by means of the support plate (68), by flexible cushions (144) filled with a liquid, interconnected by conduits (145), and secured to the plate (68), and by abutments (146) secured to the plate (68), on a transport carriage constituted by an angle iron frame provided with rollers (148), this carriage being displaceable on a rolling track formed by rails (149) by means of a motor reducer with a hollow shaft (150), by chains (151) connected by their ends to a shoe (152) secured to the carriage, and by drive and return shafts (153) provided with chain wheels (154).

23. Machine according to claim 22, characterized in that on either side of the carriage, and parallel to the rolling track (149), are secured brakes adapted to absorb the reaction forces due to the final screwing of the electrode, each brake being constituted by a jaw (157), whose shape of the braking portion is adapted to the profile of the rolling track (149), a pressure plate (158) connected to the jaw (157) by two rods traversing the upper flange of the frame (147) corresponding to the carriage, a flexible jack (159) disposed between the flange of the frame (147) and the pressure plate (158), and ensuring the closing of the brake, and return springs mounted on connecting rods of the jaw (157) and of the plate (158) ensuring the safe opening of the jaw (157).

24. Machine according to claim 22, characterized in that it is mounted on its carriage in a movable manner between two mounting stations and that its displacements are controlled by means of end-of-course devices (160) each disposed on the axis of a mounting station and secured to the flange of a rail of the rolling track (149), these end-of-course devices coacting in the end positions of the carriage, with a cam (161) secured to the latter and aligned with the axis of the sheath (3), the contact between the cam (161) and one of the end-of-course devices (160) having the effect of cutting off the feed of the motor reducer (150) and actuating the brakes.

25. Machine according to claim 22, characterized in that two identical machines are mounted side-by-side on a carriage (171) displaceable on a rolling track (172) which is pivotable at one end about a vertical standard (173), its other end by guided on a curvilinear rail (174) and driven along this rail by means of a motor reducer (175), with chain wheels (176) and a chain (177) connected to said end.

26. Machine according to claim 25, characterized in that on the curvilinear rail (174) are provided end-of-course devices (178) permitting the alignment of the axis of symmetry of the rolling track (172) of the carriage (171) in cooperation with a cam (179) secured to said rolling track (172), with the axis of the electrode to be unscrewed or replaced, and the alignment of the machines along the axis of the electrodes is defined by the contact of a cam (180), secured to the carriage (171), with end-of-course devices (181) disposed on the flank of one of the rails of the rolling track (172).

27. Machine according to claim 25, characterized in that the sheath (3), belonging to the machine for unscrewing and screwing from the end, is double walled and comprises intermediate insulation as well as an air injection device at its base creating a forced convection between the end to be unscrewed or screwed and the wall of the sheath, and the jaw supports of said machine are provided with a cooling circuit fed through a rotatable coupling (85), while the machine serving for screwing an electrode (64) comprises centering elements for said electrode, and the assembly of the device thus constituted is protected from radiation from the hearth (182) by a carapace of ceramic fibers, secured to the carriage (171) having two openings above the sheaths (3) of each machine.

28. Machine according to claim 1, characterized in that, to replace electrodes from above, the body (1) receiving the sheath (3) is connected to the handle (2) for engagement with a hook of a traversing hoist by means of pneumatic springs (184), the upper (4) and lower (5) gripping chucks, as well as the centering chuck (7) being hydropneumatically controlled, the upper chuck (4) coacting with a centering cam (75'), and a hydropneumatic pump (95') feeding said chucks through a pneumatic control circuit, whose feed is ensured by compressed air reservoirs (185) refilled periodically by means of a compressor (186).

29. Machine according to claim 28, characterized in that the centering chuck (7) is actuated by a rotatable jack (191), whose axle drives a pinion (192) secured to the chuck (7) and engaged with a toothed sector (193) secured to a cam (194) ensuring the translatory movement of the jaws (195) of the chuck by means of axles (196) sliding along ramps of the cam (194), the jaws (195) being thus brought into contact with the electrode, and having a flat part (197) disposed beneath the latter, so as to avoid any risk of accidental exit of said electrode during transport.

30. Machine according to claim 28, characterized in that it is provided moreover with a vertical axle (198) actuated by a jack (199) controlled simultaneously with the closing of the centering chuck (7) by the contact (55) via an adjustable timer, this axle (198) having on the one hand at its lower end a rod (200) inclined relative to the horizontal and secured to a movable abutment (201), secured to the other end of the axle (198), by means of a cable (202), and on the other hand, at its upper end to an abutment for actuating a contact (203) for control of a rotatable jack connected to the axle (198) and imposing on it a rotation in a circular arc so as to dispose its rod (200) along the axis of the machine.

31. Machine according to claim 30, characterized in that the abutment (201) actuates, upon descent of the machine, as soon as the rod (200) touches the electrode, an interrupter (204) for the operation of blowers (215) as well as the withdrawal of the rod (200), by reverse rotation of the rotatable jack driving the axle (198), the end-of-course device for rotation of the jack controlling the return of the axle (198) by means of a jack (199) via a contact disposed on the frame of said rotatable jack.

32. Machine according to claim 29, characterized in that one of the jaws (195) of the centering chuck (7) is provided with a control rod (205) for a distributor (206) actuating in contact with the front surface of the electrode a rotatable jack for closing the lower gripping chuck (5) by means of an axle (207) driving a pinion (208) secured to the chuck (5) and engaging with a toothed sector (209) secured to a cam (210), which ensures translatory movement of jaws (211) by means of axles (212) sliding along ramps of the cam (210), these jaws housing each a hydraulic jack (213) fed after contact with the jaws with the electrode by a hydropneumatic pump (95'), controlled by a pressure regulator mounted on a feed conduit of the rotatable jack, this presure regulator controlling simultaneously the opening of the centering chuck (7) and the pressurization of the hydraulic jacks (213), disposed in these jaws (195), by means of the pump (95').

33. Machine according to claim 28, characterized in that the gripping chuck (5) is a pair of centering points (214), retractable by means of jacks (216), and coacting with corresponding recesses (217) in a plate (218) secured to the support electrode or to the electrode clamp.

34. Transport hanger for electrodes of electric arc furnaces, characterized in that it is retractable and is comprised by threaded jaws (219) mounted slidably on a conical ramp (220) by means of axles (230) against the action of springs (231), a shaft (221) secured to a handle (222) for engagement with a hook of a traversing hoist, an assembly for locking the jaws (219) in operative position comprising a connection comprised by a cranked lever (223) coacting with rods (224) and actuating a pusher (225) provided with a pin for regulating gripping (226), an intermediate plate (232) disposed below the pusher (225), and a movable ring (227) for locking the rods (224), having on the one hand a manipulating handle (228) with a chain (233), for securement to a chain bar of the traversing hoist, and on the other hand an unblocking lug (229) for the lever (223) of the connection.

* * * * *